(12) United States Patent
Haber et al.

(10) Patent No.: US 10,589,806 B2
(45) Date of Patent: Mar. 17, 2020

(54) TRAILER LOCK

(71) Applicants: Greg Haber, Woodbury, NY (US);
Robert Haley, Glen Cove, NY (US)

(72) Inventors: Greg Haber, Woodbury, NY (US);
Robert Haley, Glen Cove, NY (US)

( * ) Notice: Subject to any disclaimer, the term of this patent is extended or adjusted under 35 U.S.C. 154(b) by 0 days.

(21) Appl. No.: 15/655,698

(22) Filed: Jul. 20, 2017

(65) Prior Publication Data

US 2018/0022406 A1 Jan. 25, 2018

Related U.S. Application Data

(60) Provisional application No. 62/365,357, filed on Jul. 21, 2016.

(51) Int. Cl.
*E05B 67/36* (2006.01)
*B62D 53/08* (2006.01)

(52) U.S. Cl.
CPC ............ *B62D 53/085* (2013.01); *E05B 67/36* (2013.01)

(58) Field of Classification Search
CPC .............................. B62D 53/085; E05B 67/36
USPC ...... 70/258, 238, 232, 237, 14, 34; 280/507, 280/432, 433, 423.1
See application file for complete search history.

(56) References Cited

U.S. PATENT DOCUMENTS

| | | | |
|---|---|---|---|
| 1,479,828 A * | 1/1924 | Morrison | B62D 53/10 280/432 |
| 2,038,975 A | 4/1938 | Willetts | |
| 2,162,181 A | 6/1939 | Skinner | |
| 2,353,992 A | 7/1944 | Bramble | |
| 2,376,478 A | 5/1945 | Dellbringge | |
| 2,831,704 A | 4/1958 | Tenenbaum | |
| 2,969,993 A | 1/1961 | Jasper | |
| 3,031,206 A | 4/1962 | Shinn | |
| 3,135,528 A | 6/1964 | Martin | |
| 3,420,548 A | 1/1969 | Wakeman | |
| 3,740,076 A | 6/1973 | Cupp | |
| 3,863,952 A * | 2/1975 | Hodgson | B62D 53/12 280/432 |

(Continued)

FOREIGN PATENT DOCUMENTS

| | | |
|---|---|---|
| EP | 0051464 A2 | 12/1982 |
| EP | 0697328 A1 | 2/1996 |

(Continued)

OTHER PUBLICATIONS

English abstract for EP 0697328 A1.

(Continued)

*Primary Examiner* — Suzanne L Barrett
(74) *Attorney, Agent, or Firm* — Desmarais LLP

(57) ABSTRACT

A trailer lock can be used as an anti-theft device to secure a mating feature of a trailer, such as a king pin, against unauthorized hookups by tractors. The trailer lock can include a base plate for mounting on a wall of the trailer; a swing bar pivotally connected to the base plate; and an engagement bar pivotally connected to the swing bar, which engagement bar includes an engagement feature, such as a ring, capable of fitting to the mating feature of the trailer. When the engagement feature is fitted to the mating feature of the trailer (for example, when a ring is placed over a king pin), it can prevent the mating feature from engaging a corresponding mating feature of a tractor, such as a fifth wheel.

25 Claims, 30 Drawing Sheets

(56) References Cited

U.S. PATENT DOCUMENTS

| | | | |
|---|---|---|---|
| 4,339,140 A | 7/1982 | Abolins | |
| 4,556,232 A | 12/1985 | Sever | |
| 4,614,357 A | 9/1986 | Murray | |
| 4,697,444 A * | 10/1987 | Maffey | B62D 53/085 70/232 |
| 4,835,999 A * | 6/1989 | Chant | B60R 25/008 70/199 |
| 4,882,921 A * | 11/1989 | Wopinski | B62D 53/085 70/231 |
| 5,172,574 A * | 12/1992 | Perfetto | E05B 67/38 292/281 |
| 5,724,838 A * | 3/1998 | Alicea | B60R 25/0221 70/18 |
| 6,070,688 A | 6/2000 | Schulz | |
| 6,073,470 A * | 6/2000 | Burnitzki | B60R 25/001 70/225 |
| 6,073,740 A | 6/2000 | Bumitzki | |
| 6,109,078 A | 8/2000 | Marshall | |
| 6,394,480 B1 | 5/2002 | Brennan | |
| 6,729,595 B2 | 5/2004 | Smith | |
| 6,962,361 B1 | 11/2005 | Price | |
| 7,425,012 B1 | 9/2008 | Sease | |
| 8,505,954 B1 | 8/2013 | Haley | |
| 8,840,130 B2 * | 9/2014 | Columbia | B60D 1/06 280/504 |
| 2002/0109335 A1 * | 8/2002 | Putnam | B60D 1/065 280/507 |
| 2008/0295549 A1 | 12/2008 | Hsieh | |
| 2009/0102159 A1 * | 4/2009 | Van Laere | B60D 1/60 280/507 |
| 2010/0266336 A1 | 10/2010 | Bickel, III | |
| 2012/0182139 A1 | 7/2012 | Raines | |
| 2016/0059648 A1 * | 3/2016 | Harper | B60D 1/52 280/507 |

FOREIGN PATENT DOCUMENTS

| | | |
|---|---|---|
| FR | 2587662 A1 | 3/1987 |
| GB | 2256176 A | 12/1992 |
| NL | 8801145 A | 12/1989 |
| WO | WO 0128846 A1 | 4/2001 |
| WO | WO 2004096626 A1 | 11/2004 |

OTHER PUBLICATIONS

English abstract for FR 2587662 A1.
English abstract for NL 8801145 A.
Non-Final Office Action in U S. Appl. No. 14/823,560, dated Feb. 27, 2018.
Advisory Action, U.S. Appl. No. 14/823,590 dated (Sep. 17, 2019).

* cited by examiner

TRAILER LOCK

CROSS-REFERENCE TO RELATED APPLICATIONS

This application is a non-provisional application of, and claims priority to, U.S. Provisional Patent App. No. 62/365,357, filed on Jul. 21, 2016. The disclosure of U.S. Provisional Patent App. No. 62/365,357 is hereby incorporated by reference in its entirety.

BACKGROUND

Trailers can be used to transport cargo or other items. Many trailers include a mating feature that can engage with and disengage from a corresponding mating feature on a vehicle. For example, trailers for use with a tractor truck typically include a king pin on the underside of the trailer that engages with a corresponding recess or "fifth wheel" on the tractor truck.

To prevent the theft of a trailer when it is not engaged with a vehicle, anti-theft devices may be used. Current anti-theft devices often consist of a metal sleeve mounted directly on the king pin underneath the trailer. The added bulk of the metal sleeve prevents the king pin from fitting into the fifth wheel of a tractor. The sleeve may include a lock on the sleeve that prevents the sleeve from being removed from the king pin.

Current anti-theft devices have several disadvantages, however. Sleeve-style locks can also become dirty, greasy, and difficult to use. Further, the effort required to deploy many current anti-theft devices for trailers can discourage their use, which can leave trailers exposed to theft. For example, sleeve-style locks typically require a user to crawl underneath the trailer to mount the sleeve on the king pin. That can result in truckers having to climb on their hands and knees under trailers in dirt and mud to mount the sleeve lock on the king pin, which in turn can result in on-the-job injuries, disability, and workers' compensation claims.

Further, insurers and customers often require that anti-theft devices be deployed on a trailer to prevent cargo from being stolen. A trucking company may require that its truckers mount anti-theft devices on the trailers they carry as a matter of policy. The trucking company may have someone inspect the trailers carried by its truckers to ensure that its truckers are using an anti-theft device. One drawback of current anti-theft devices, such as a sleeve-style trailer lock mounted underneath a trailer on a king pin, is that it is not immediately visually obvious that the sleeve-style lock has been mounted on the trailer in accordance with company policy. Determining whether a sleeve-style lock has been mounted often requires someone to crawl underneath the trailer to get a line of sight to the king pin.

Those problems and others are not only present in current sleeve-style trailer locks, but among many different kinds of trailers and trailer locks.

BRIEF DESCRIPTION OF THE DRAWINGS

The following detailed description and accompanying drawings illustrate various aspects of this disclosure and many of the advantages that this disclosure provides.

FIG. 1A is a photograph depicting an environmental view of an illustrative trailer lock assembly, while

DETAILED DESCRIPTION OF THE DRAWINGS

Generally described, aspects of the present disclosure relate to a trailer lock. In certain embodiments, the trailer lock includes a base plate for mounting on a wall of a trailer; a swing bar pivotally connected to the base plate; and an engagement bar pivotally connected to the swing bar, which engagement bar includes an engagement feature, such as a ring, capable of fitting to a mating feature of the trailer, such as a king pin. The trailer lock can further include a lock bar to provide additional engagement between the engagement feature of the engagement bar and the mating feature of the trailer. In one embodiment, the lock bar is at least partially housed within the engagement bar and slideably coupled to the engagement bar so that the lock bar can slide back and forth with respect to the engagement bar. The lock bar can optionally include a yoke for providing additional engagement with a mating feature as well. Further information regarding king pins and trailers can be found in U.S. Pat. No. 8,505,954, the disclosure of which is hereby incorporated by reference in its entirety.

Aspects of the present disclosure also relate to methods for operating the trailer locks disclosed herein. One example method for operating a trailer lock includes pivoting the swing bar with respect to the base plate, then pivoting the engagement bar with respect to the pivoted swing bar in order to fit the engagement bar's engagement feature to the mating feature of the trailer. For a trailer bar lock that also includes a lock bar, the lock bar can be brought into contact with the mating feature (for example, by sliding it through the engagement bar) once the engagement feature has been fitted over the mating feature to provide additional engagement with the mating feature.

Figure 1A:
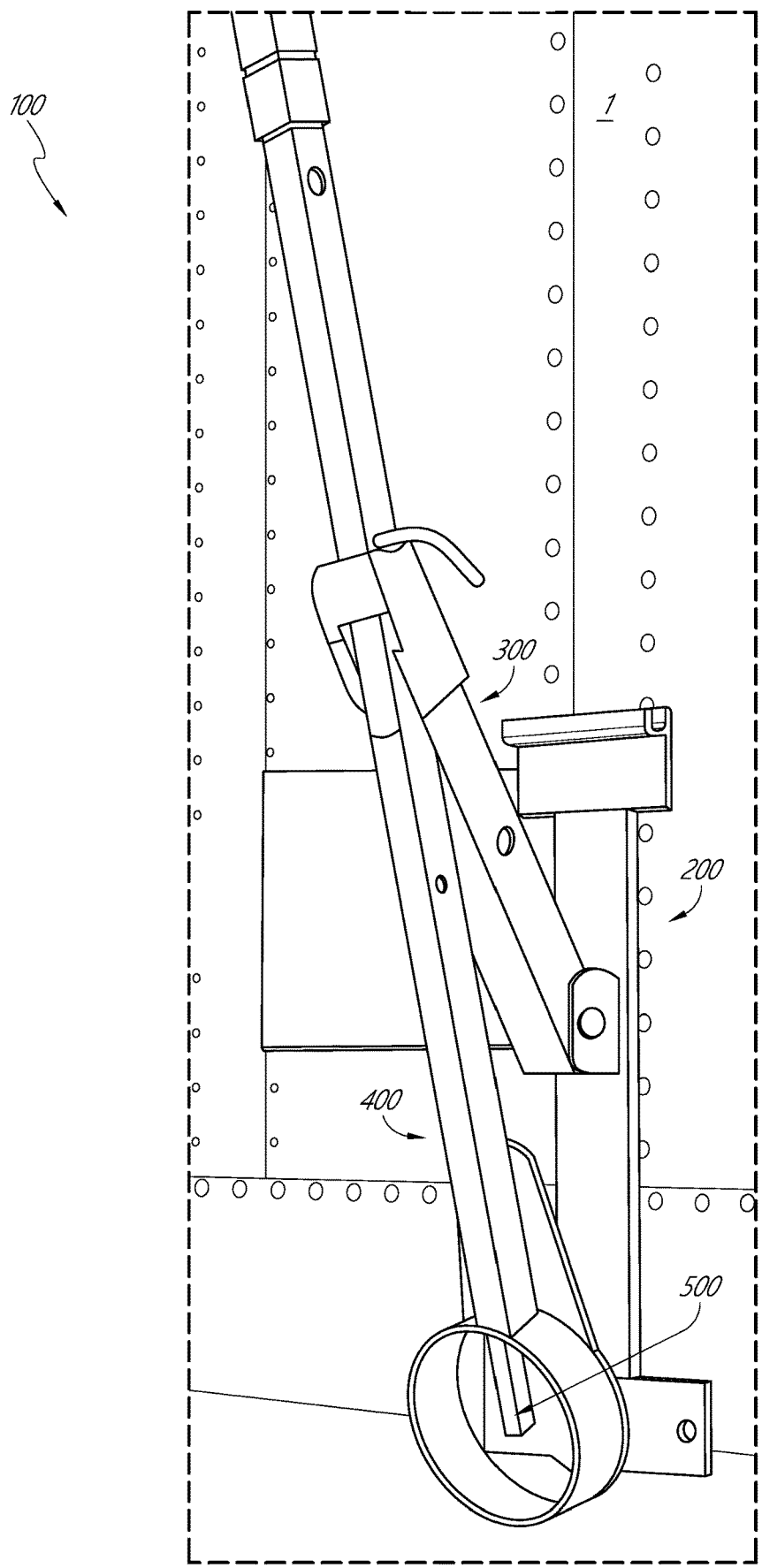

Turning to the figures, in which like reference numerals refer to like elements, FIG. 1A shows an example implementation of a trailer lock assembly according to the present disclosure in which an illustrative trailer lock 100 is mounted on a trailer wall 1. The trailer lock 100 includes a base plate 200 mounted to a trailer wall 1. Pivotally connected to the base plate 200 is a swing bar 300. The engagement bar 400 is pivotally connected to the swing bar 300. The lock bar 500 passes inside the engagement bar 400.

Figure 1B:
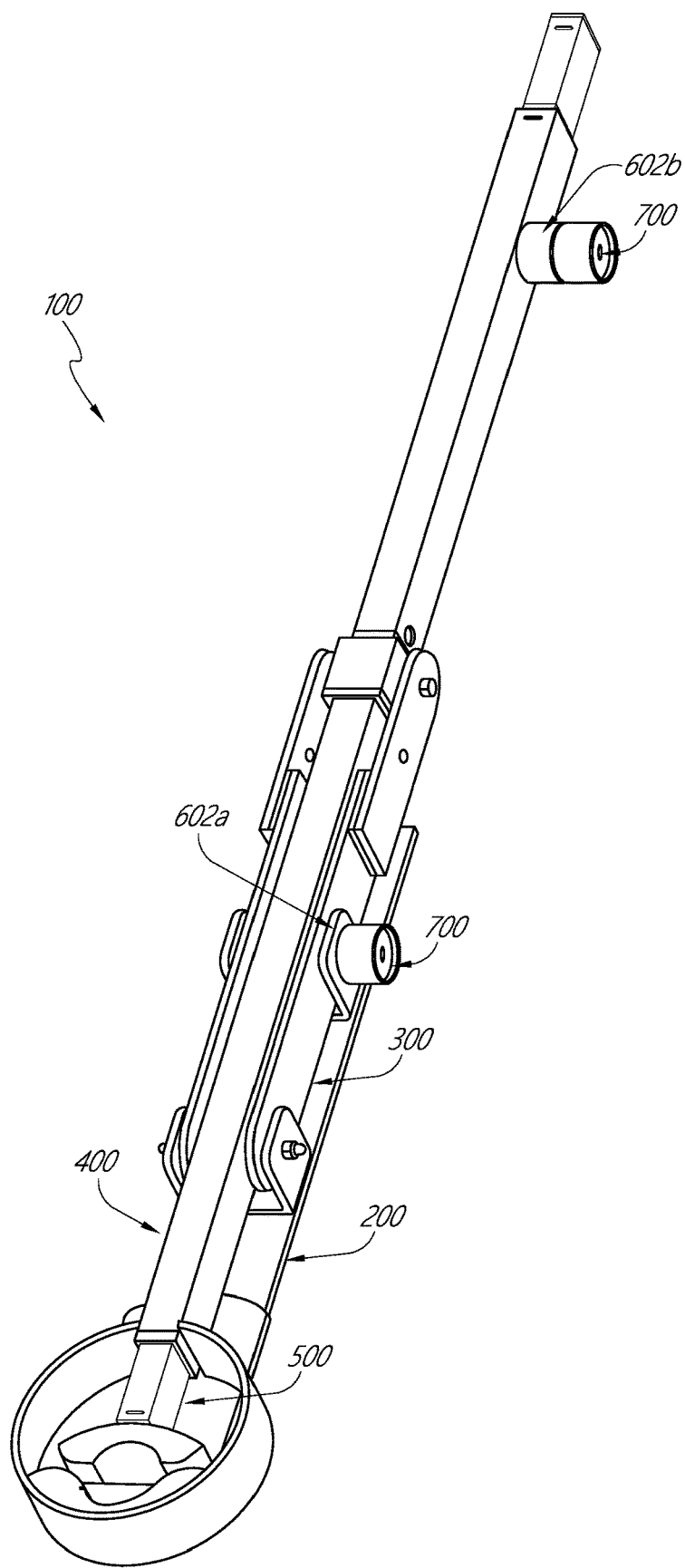
FIG. 1B is an environmental view of an illustrative trailer lock.

FIG. 1B shows another example implementation of a trailer lock according to the present disclosure. Similar to the example shown in FIG. 1A, the trailer lock 100 shown in FIG. 1B includes a base plate 200 mounted to a trailer wall 1. Pivotally connected to the base plate 200 is a swing bar 300. The engagement bar 400 is pivotally connected to the swing bar 300. The lock bar 500 passes inside the engagement bar 400. The trailer lock 100 shown in FIG. 1B also includes holes 602a and 602b for receiving bullet locks 700, which are discussed further below in the context of FIG. 15 and FIG. 16.

Figure 2:
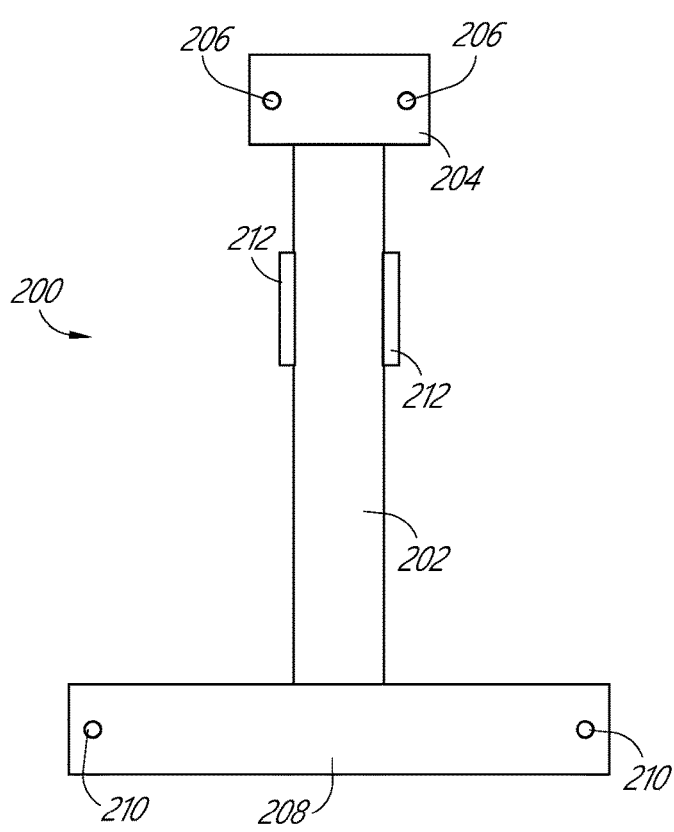
FIG. 2 and FIG. 3 are environmental views depicting an illustrative base plate.
Figure 3:
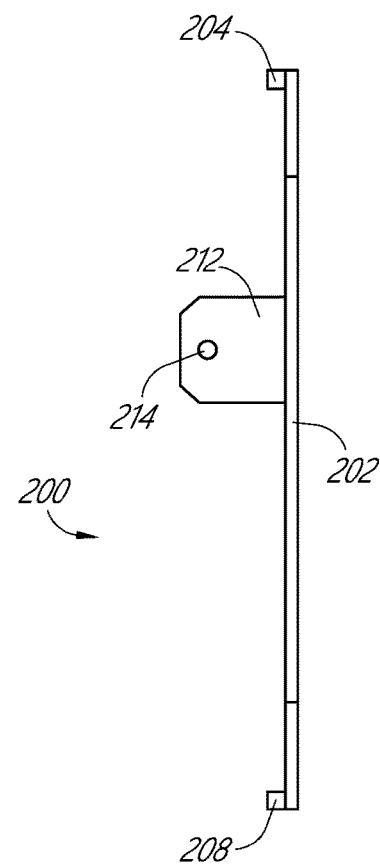

FIG. 2 shows an example base plate 200 is shown in a direct view as it would be mounted on a wall of a trailer. FIG. 3 is a profile view of the same example base plate 200 shown in FIG. 2. As FIG. 2 and FIG. 3 are two different views of the same example base plate 200, those figures are discussed together herein. The base plate 200 can include a vertical segment 202 and horizontal segments 204 and 208. The vertical segment 202 and horizontal segments 204 and 208 can be integrally formed from one piece of material, or welded together from separate pieces of material.

The horizontal segments 204 and 208 can include one or more holes 206 and 210. Bolts passing through one or more of the holes 206 and 210 can be used to mount the base plate 200 to a trailer wall. For example, the base plate is bolted to the exterior front wall of the trailer (i.e., the wall of the trailer closest to the tractor) via one or more bolts that pass through the exterior front wall of the trailer. The base plate 200 can be mounted to a wall of the trailer 1 in many different configurations. Different techniques can be used to mount the base plate 200 to a wall of the trailer 1, however, such as rivets. The base plate 200 could also be mounted to other walls of the trailer, such as a side wall of the trailer. Alternatively, the base plate 200 could be integrally formed as part of a trailer wall 1.

The example base plate 200 in FIG. 2 and FIG. 3 also includes two protruding fins 212 for pivotally connecting a swing bar 300 to the base plate. Each fin 212 can include a hole 214 through which a bolt or an axle may pass, which bolt or axle may pass through a corresponding hole in the swing bar 300.

Figure 15:
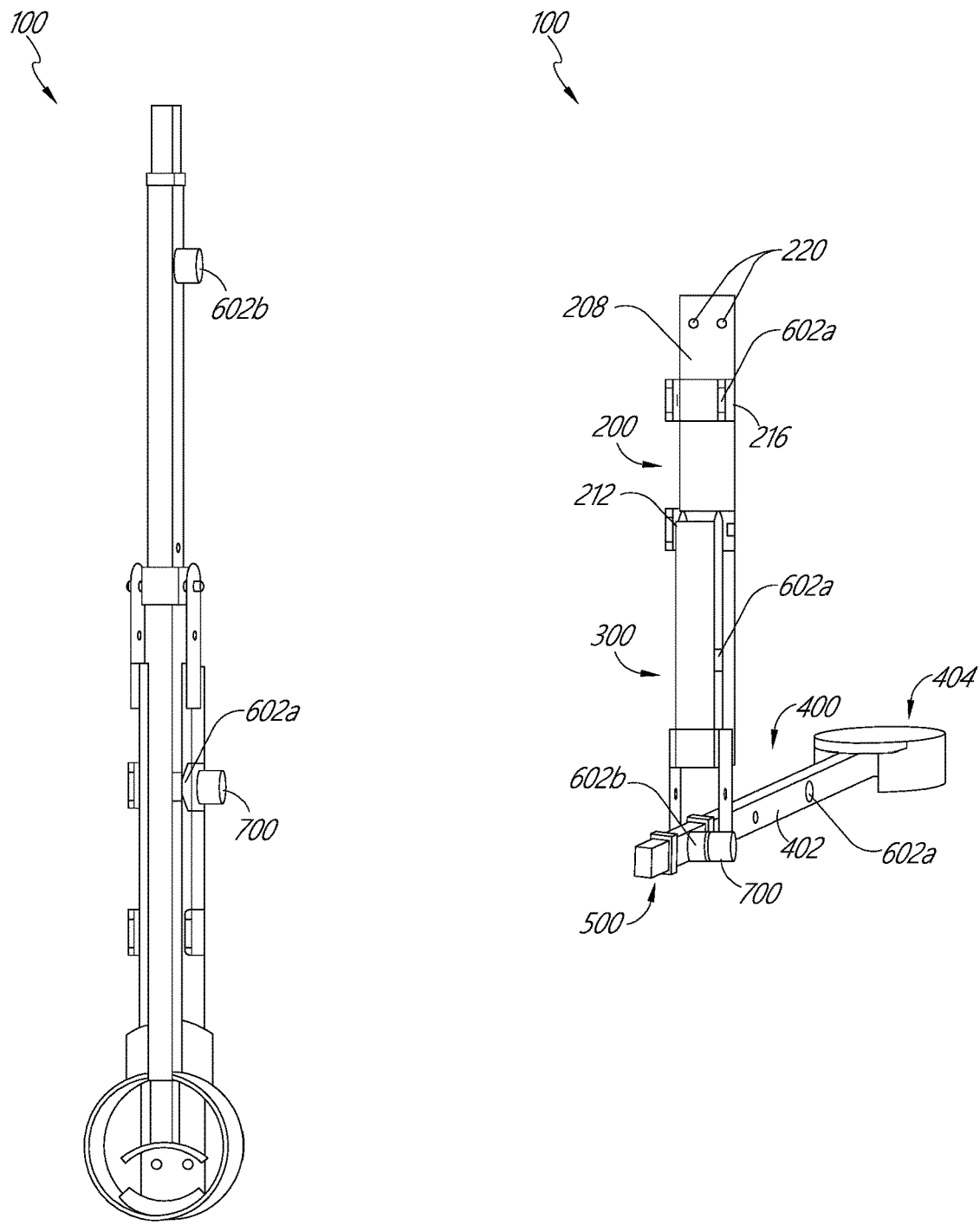
FIG. 15 is an environmental view of an illustrative locking assembly for a trailer lock.

In addition to the components shown in FIG. 2 and FIG. 3, a base plate 200 can also include lock fins 216 as shown in FIG. 15. Each lock fin 216 can include a hole 602a for the insertion of a bullet lock 700, as discussed in greater detail below with respect to FIG. 15 and FIG. 16. As also shown in FIG. 15, a base plate 200 may omit horizontal portions 206 and 208. Instead, the vertical portion 202 may be provided with one or more holes 220 through which bolts or other fasteners may pass in order to mount the base plate 200 to a trailer wall.

Figure 4:
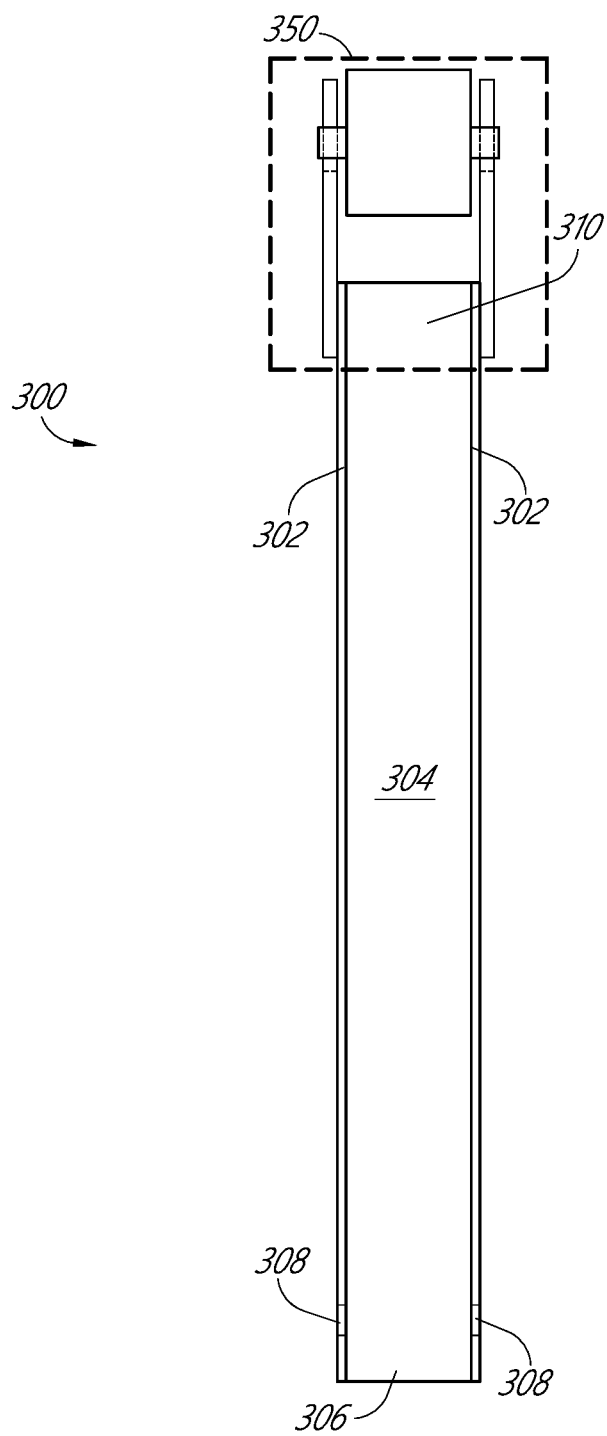
FIG. 4 is an environmental view depicting an illustrative swing bar.

With reference now to FIG. 4, FIG. 4 depicts an example swing bar 300. The example swing bar 300 shown in FIG. 4 includes three portions: two lateral portions 302 and a central portion 304. The lateral portions 302 and the central portion 304 define a U-shaped channel whose width is at least as wide as the engagement bar 400, so that the engagement bar 400 can fit inside the channel defined by the swing bar's lateral portions 302 and central portion 304.

At the proximal end 306 of the swing bar 300, the lateral portions 302 of the swing bar 300 can be provided with one or more holes 308 that correspond to the holes 214 in the fins 212 of the base plate 200. For example, a bolt can pass through a hole 214 on a fin 212 and a corresponding hole 308 of the lateral portion 304 of the proximal end of the swing bar 306. Alternatively, an axle can pass through holes 308 in both lateral portions 302 of the swing bar and corresponding holes 214 in both fins 212 of the base plate 200. Other forms of pivotal connections between the swing bar 300 and the base plate 200 can be used as well.

Figure 5:
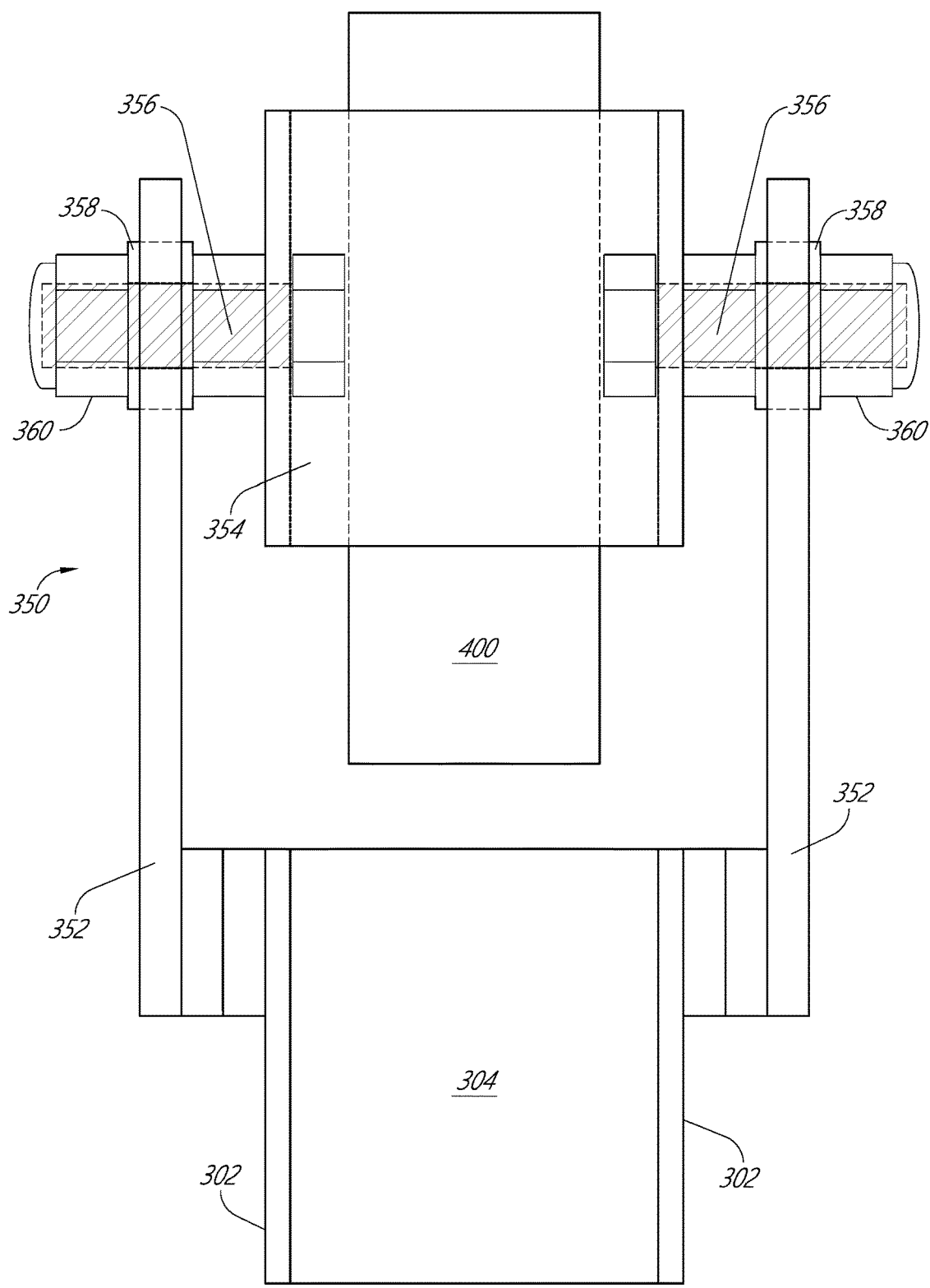
FIG. 5 is an environmental view depicting an illustrative pivot.

The distal end of the swing bar 300 includes a pivot assembly 350 for pivotally connecting the swing bar to the engagement bar. The pivot assembly 350, shown in greater detail in FIG. 5, includes extensions 352 that are riveted, welded, or otherwise fastened to lateral portions 302 of the swing bar 300. The pivot assembly 350 also includes a box 354 that can rotate with respect to the end of the swing bar, through which box 354 an elongated portion 402 (a portion of which is shown in FIG. 5) of an engagement bar 400 can slide. The box 354 is connected to the extensions 352 by two bolts 356. The head of each bolt 356 lies inside the box 354, while the shank of the bolt 356 passes through an extension 352, which can optionally be provided with a spacer 358. The end of each shank of the bolts 356 can be covered by a bolt cap 360. In some embodiments, a rivet passing through box 354 and through extension 352 may take the place of a bolt 356. With this pivot assembly 350, the engagement bar 400 can both pivot with respect to the swing bar 300 and slide through the box 354. In some embodiments, the interior of the box 354 is fitted with a low-friction polymer bushing, such as a polytetrafluoroethylene (PTFE) bushing, to facilitate sliding the engagement bar 400 through the box 354. That polymer bushing is indicated as reference number 416 in FIG. 13D.

Figure 6:
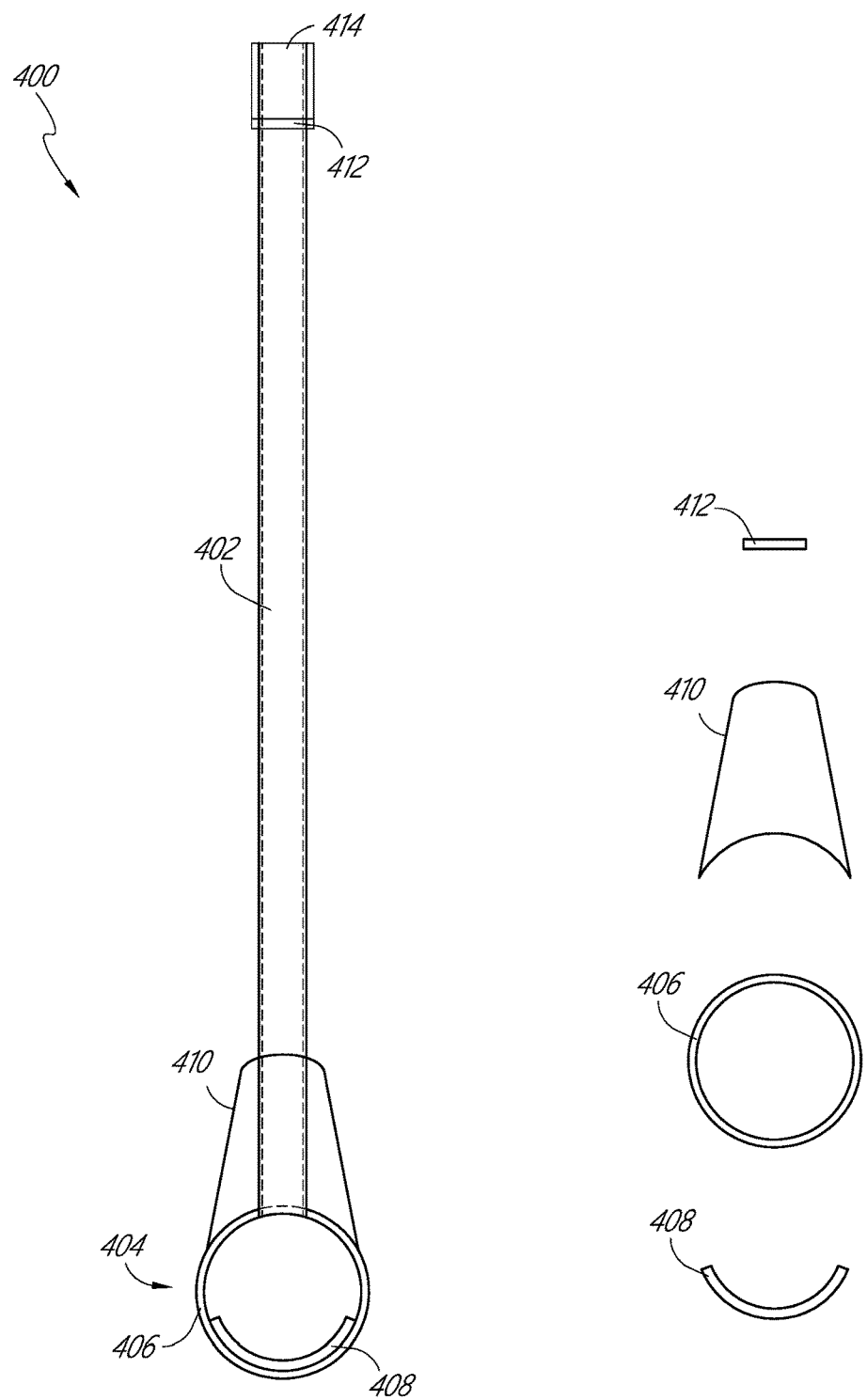
FIG. 6 is an environmental view and exploded view depicting an illustrative engagement bar and illustrative components thereof.

Turning now to FIG. 6, an example engagement bar 400 is shown with some of its components in an exploded view. The engagement bar 400 includes an elongated portion 402. In some embodiments, the elongated portion 402 has a substantially rectangular cross-section along the length of the elongated portion 402. That substantially rectangular cross section can advantageously improve the strength of the engagement bar 400 against being dislodged or pried away from a locked position. At a distal end of the elongated portion 402 of the engagement bar 400 is an engagement feature 404. The engagement feature 404 in FIG. 6 includes a ring 406 and a brace 408. The shape of the engagement feature 404 can be selected to fit a mating feature of a trailer. For example, if the trailer includes a round king pin as a mating feature, the engagement feature 404 can include a ring 406 with an inner diameter that is larger than the greatest diameter of the kingpin. To provide additional mechanical support to the engagement feature 404, a gusset 410 can be welded to the engagement feature 404 and elongated portion 402. The length of the elongated portion 402 of the engagement bar 400 is selected so that the engagement feature 404 can be fitted to the mating feature of the trailer when the engagement bar 400 is pivoted underneath the trailer.

Optionally, a rubber shock absorber 412 and/or a stop element 414 can be included at the proximal end of the elongated portion 402 of the engagement bar 400. The sizes of the rubber shock absorber 412 and stop element 414 are selected so that the elongated portion 402 of the engagement bar 400 is retained by the box 354 of the pivot assembly 350. That can be accomplished by selecting a rubber shock absorber 412 and stop element 414 that are too large to pass through the interior of the box 354. The rubber shock absorber 412 absorbs mechanical shock that can occur when the engagement bar 400 passes through the box 354, such as can occur when the rubber shock absorber 412 collides with the box 354 as the engagement bar 400's elongated portion 402 slides through the box 354.

Figure 7:
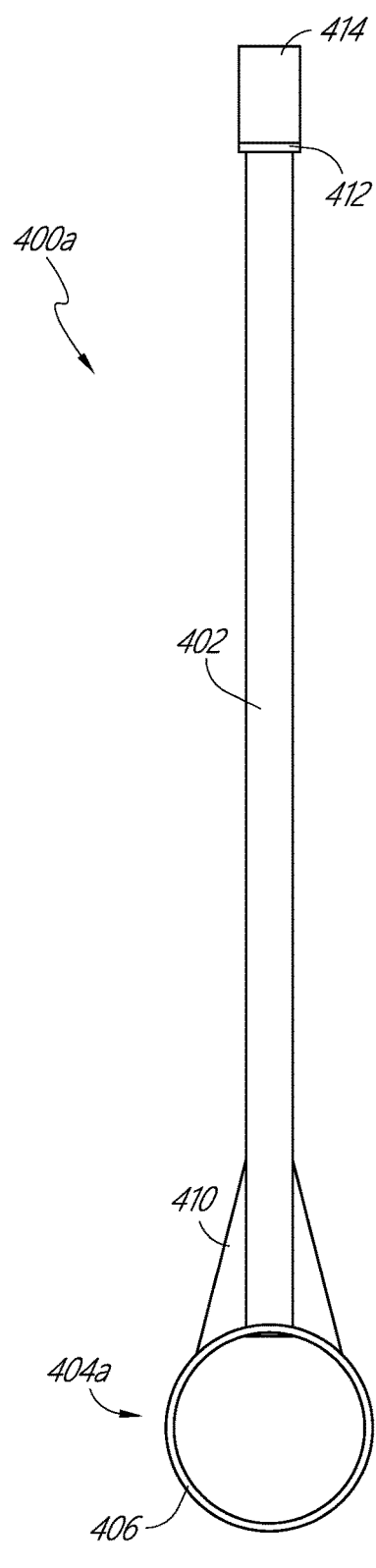
FIG. 7 is an environmental view of an illustrative engagement bar.
Figure 8:
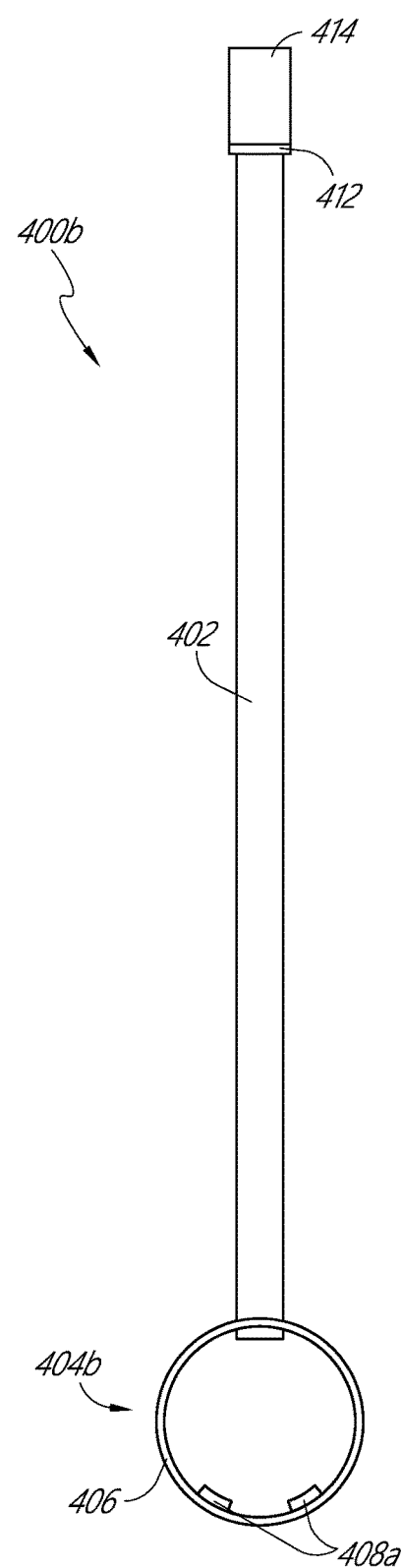
FIG. 8 is an environmental view of an illustrative engagement bar.

Other configurations of the engagement bar 400 are possible, as shown in FIG. 7 and FIG. 8. The alternate engagement bar 400a in FIG. 7 lacks a brace 408, for instance, while the alternate engagement bar 400b shown in FIG. 8 includes multiple bracing elements 400b while omitting the gusset 410. Further, in some embodiments, the elongated portion 402, the rubber shock absorber 412, and the stop element 414 of the engagement bar 400 are hollow to permit a lock bar 500 to be inserted therethrough and to permit the lock bar 500 to slide back and forth within the engagement bar 400. In those embodiments, the interior portions of one or more of the elongated portion 402, the rubber shock absorber 412, and the stop element 414 may be coated with a low-friction polymer coating, such as PTFE, or fitted with a hollow polymer insert, such as a PTFE insert. The polymer coating or insert reduces friction between the lock bar 500 and the elongated portion 402, the rubber shock absorber 412, and the stop element 414 as the lock bar 500 slides through them.

The engagement feature 404 may also include a slot to permit a portion of a lock bar 500 to enter into the space circumscribed by the engagement feature 404 via the hollow elongated portion 402. For example, a slot can be provided in the ring 406 shown in FIG. 7 and FIG. 8 to permit the lock bar 500 to slide into the space circumscribed by the ring 406. The slot may be fitted with a low-friction polymer bushing, such as a PTFE bushing, to facilitate movement of the lock bar 500 into and out of the space circumscribed by the ring 406.

Figure 9:
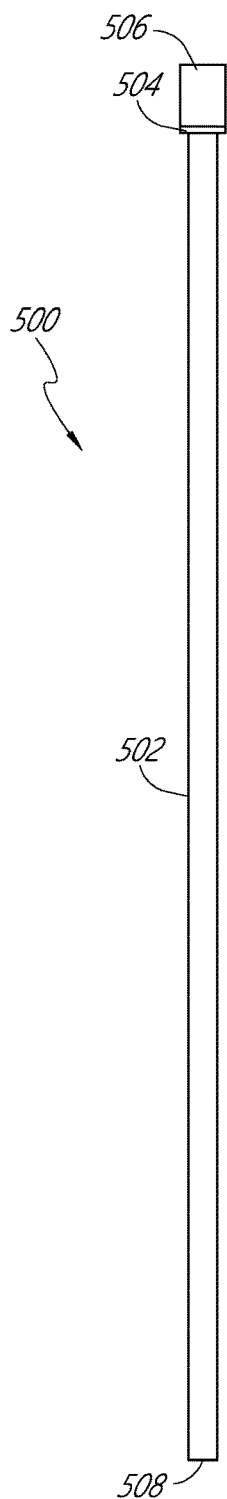
FIG. 9 is an environmental view of an illustrative lock bar.
Figure 10:
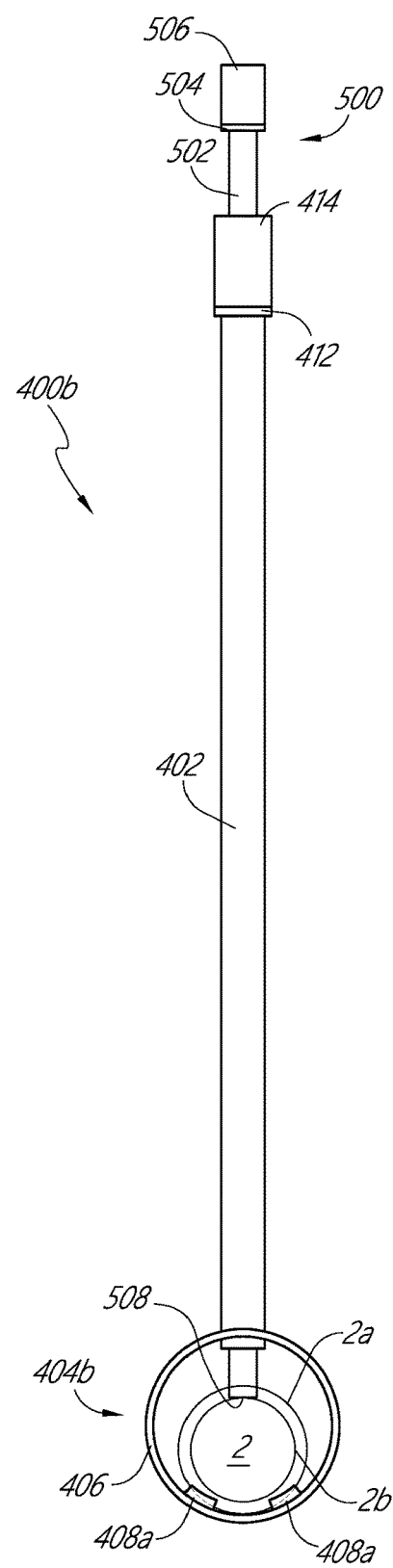
FIG. 10 is an environmental view of the illustrative lock bar of FIG. 9 slideably coupled to an engagement arm to engage a mating feature of a trailer.

FIG. 9 and FIG. 10 show an illustrative lock bar 500 in use with the illustrative engagement bar 400b shown in FIG. 8. The lock bar 500 can include an elongated portion 502; a rubber shock absorber 504 and a stop element 506 at the proximal end of the lock bar 500; and a distal end 508. In some embodiments, the elongated portion 502 has a substantially rectangular cross-section along the length of the elongated portion 502. That substantially rectangular cross section can advantageously improve the strength of the lock bar 500 against being dislodged from a locked position. As shown in FIG. 10, the elongated portion 502 of the lock bar 500 can be inserted through at least a portion of the interior of the engagement bar 400b and slid back and forth within the elongated portion 402, the rubber shock absorber 412, and the stop element 414 of the engagement bar 400b. In some embodiments, the elongated portion 502 of the lock bar 500 is coated with a low-friction polymer coating, such as PTFE, to reduce friction between the elongated portion 502 as it slides within the elongated portion 402, the rubber shock absorber 412, and the stop element 414 of the engagement bar 400b. The widths of the lock bar 500's rubber shock absorber 504 and stop element 506 are selected to be larger than the width of the elongated portion 502 of the lock bar so that the rubber shock absorber 504 and stop element 506 cannot pass through the engagement bar 400's stop element 414, thereby preventing the lock bar 500 from passing completely through the engagement bar 400b. The rubber shock absorber 504 absorbs mechanical shock that can occur when the lock bar 500 passes through the hollow elongated portion 402, such as can occur when the rubber shock absorber 504 collides with the stop element 414 as the lock bar 500 is slid through the interior of the engagement bar 400b.

The combination of the lock bar 500 and engagement feature 404b can advantageously provide a secure fit to a mating feature of a trailer, shown here in a top-down cross-sectional view as a spool-shaped king pin 2 with an outer circumference 2a and an inner circumference 2b. The ring 406 can positioned around the king pin 2 such that the bracing elements 408a rest on top of or lie above the outer circumference 2b of the king pin. The lock bar 500 can then be advanced through the hollow elongated portion 402 such that the distal end 508 of the lock bar 500 also rests on top or lies above the outer circumference 2b of the king pin. Preferably, the distal end 508 can be advanced such that it contacts the inner circumference 2b of the king pin and causes the bracing elements 408a to come into contact with the inner circumference 2b to press fit the distal end 508 and bracing elements 408a to the inner circumference 2b.

Figure 11:
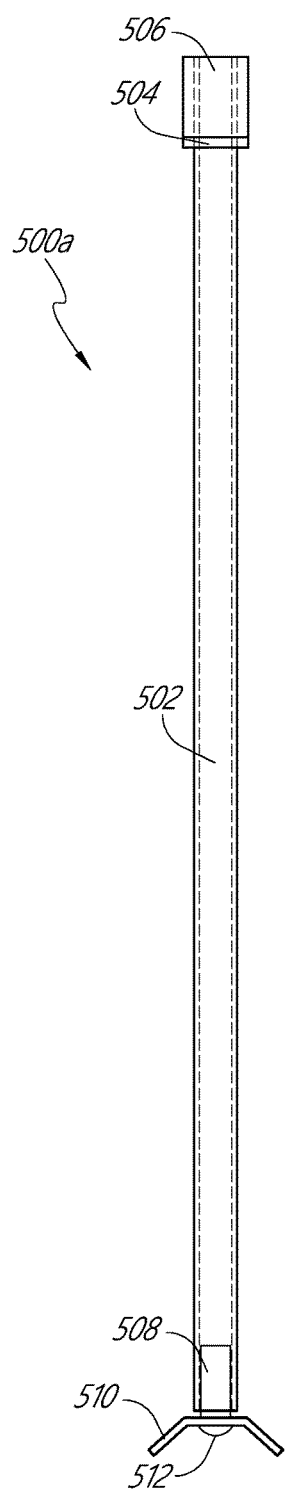
FIG. 11 is an environmental view of an illustrative lock bar.
Figure 12:
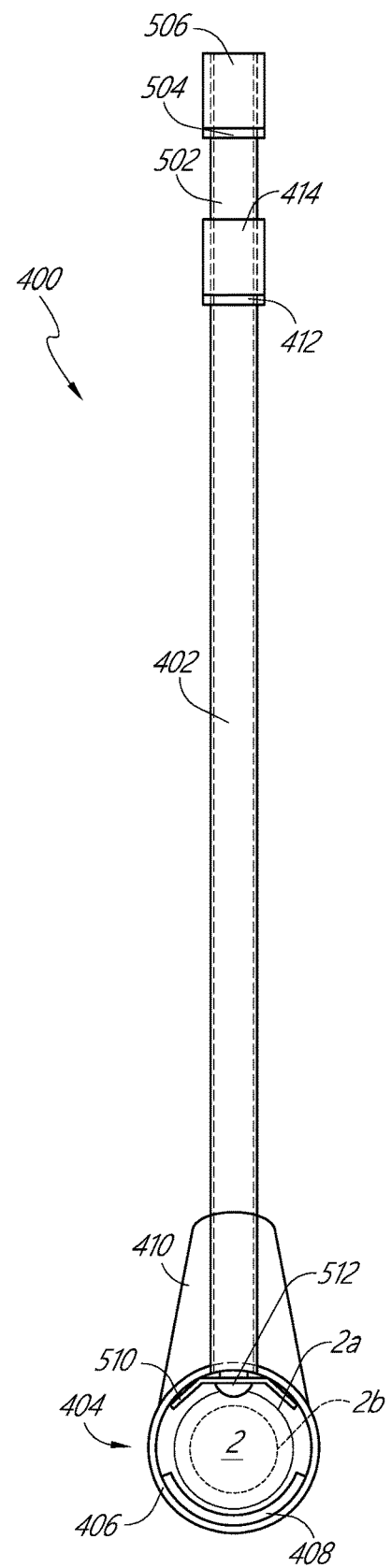
FIG. 12 is an environmental view of the illustrative lock bar of FIG. 11 slideably coupled to an engagement arm to engage a mating feature of a trailer.

FIG. 11 and FIG. 12 depict an alternative illustrative lock bar 500a in use with the illustrative engagement bar 400 shown in FIG. 6. The lock bar 500a is generally similar to the lock bar 500, and includes an elongated portion 502; a rubber shock absorber 504 and a stop element 506 at the proximal end of the lock bar 500; and a distal end 508. A yoke 510 is also included at the distal end 508 of the lock bar 500a. In some embodiments, the distal end 508 and the yoke 510 can include hollow threaded regions for receiving a fastener 512, such as a screw or bolt, in order to fasten the yoke 510 to the distal end 508 of the lock bar 500.

In other embodiments, the distal end 508 includes a female threaded portion and the yoke 510 includes a male threaded portion so that the distal end 508 and the yoke 510 can be fastened to one another without the use of a fastener 512. In still other embodiments, the distal end 508 includes a male threaded portion and the yoke 510 includes a female threaded portion so that the distal end 508 and the yoke 510 can be fastened to one another without the use of a fastener 512.

Whether or not a fastener 512 is used, providing threaded regions on the distal end 508 and the yoke 510 can facilitate assembly of the lock bar 500, as the yoke 510 can be easily screwed to or unscrewed from the distal end 508 by hand or with commonly available tools. Further, because mating features such as king pins can vary in size from trailer to trailer, yokes 510 may be provided in multiple different shapes (i.e., composed of one or more curvilinear segments as shown in FIGS. 1A and 1B, composed of one or more linear segments as shown in FIG. 11 and FIG. 12, composed of a mixture of curvilinear and linear segments, etc.) and sizes. A yoke 510 with the appropriate size and shape to fit over a particular trailer's mating feature can be selected and fastened to the distal end 508 as described above. That yoke 510 can be unfastened (i.e., by removing the fastener 512 or unscrewing a threaded yoke 510 from a distal end 508 with an opposite gendered thread) and replaced with a differently shaped or sized threaded yoke 510 to fit a differently shaped or sized mating feature if desired.

In other embodiments, the yoke can be welded or riveted to the distal end 508 of the lock bar 500a after the elongated portion 502 has been inserted far enough through the engagement bar 400 that the distal end 508 of the lock bar 500a protrudes from the distal end of the engagement bar 400.

Similar to the engagement bar 400b and lock bar 500 shown in FIG. 9 and FIG. 10, the combination of the lock bar 500a and engagement feature 404 shown in FIG. 12 can advantageously provide a secure fit to a mating feature of a trailer, again shown here in a top-down cross-sectional view as a spool-shaped king pin 2 with an outer circumference 2a and an inner circumference 2b. The ring 406 can positioned around the king pin 2 such that the brace 408 rests on top of or lie above the outer circumference 2b of the king pin. The lock bar 500a can then be advanced through the hollow elongated portion 402 such that the yoke 510 of the lock bar 500a also rests on top or lies above the outer circumference 2b of the king pin. Preferably, the yoke 510 can be advanced such that it contacts the inner circumference 2b of the king pin and causes the brace 406 to come into contact with the inner circumference 2b to press fit the yoke 510 and brace 406 to the inner circumference 2b.

Figure 13A:
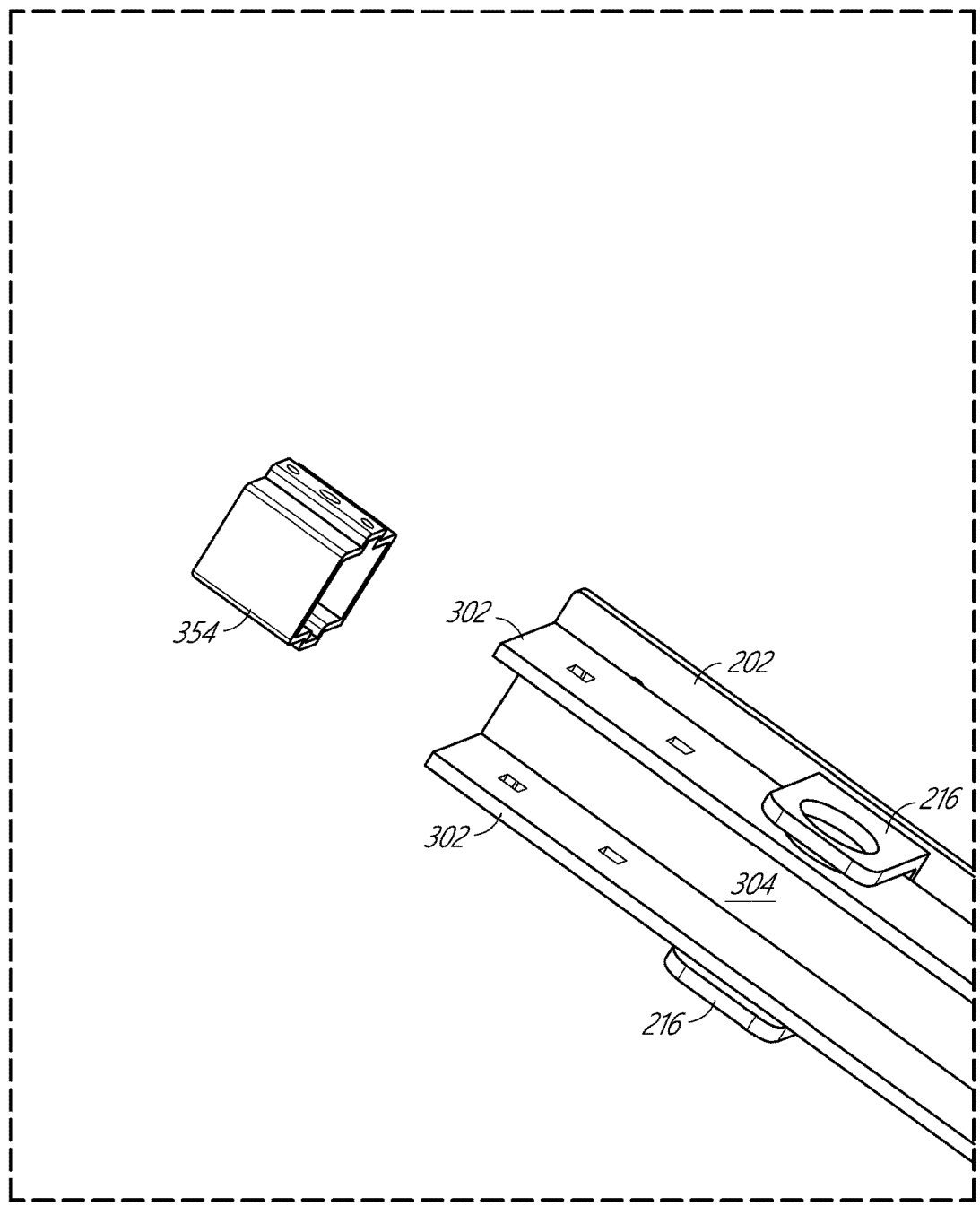
FIGS. 13A-13J are a series of environmental views depicting an illustrative method of assembling a trailer lock according to the present disclosure.
Figure 13B:
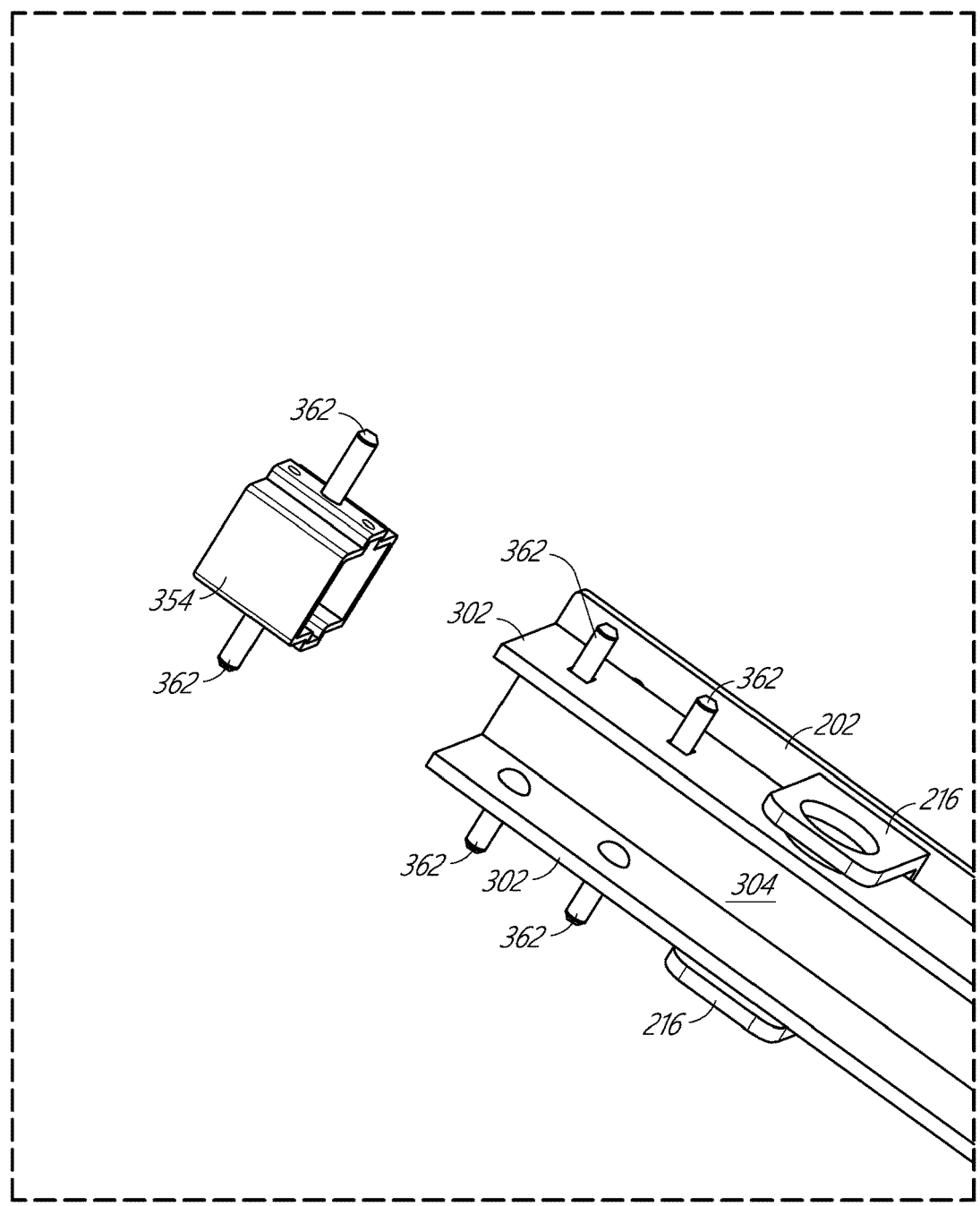
Figure 13C:
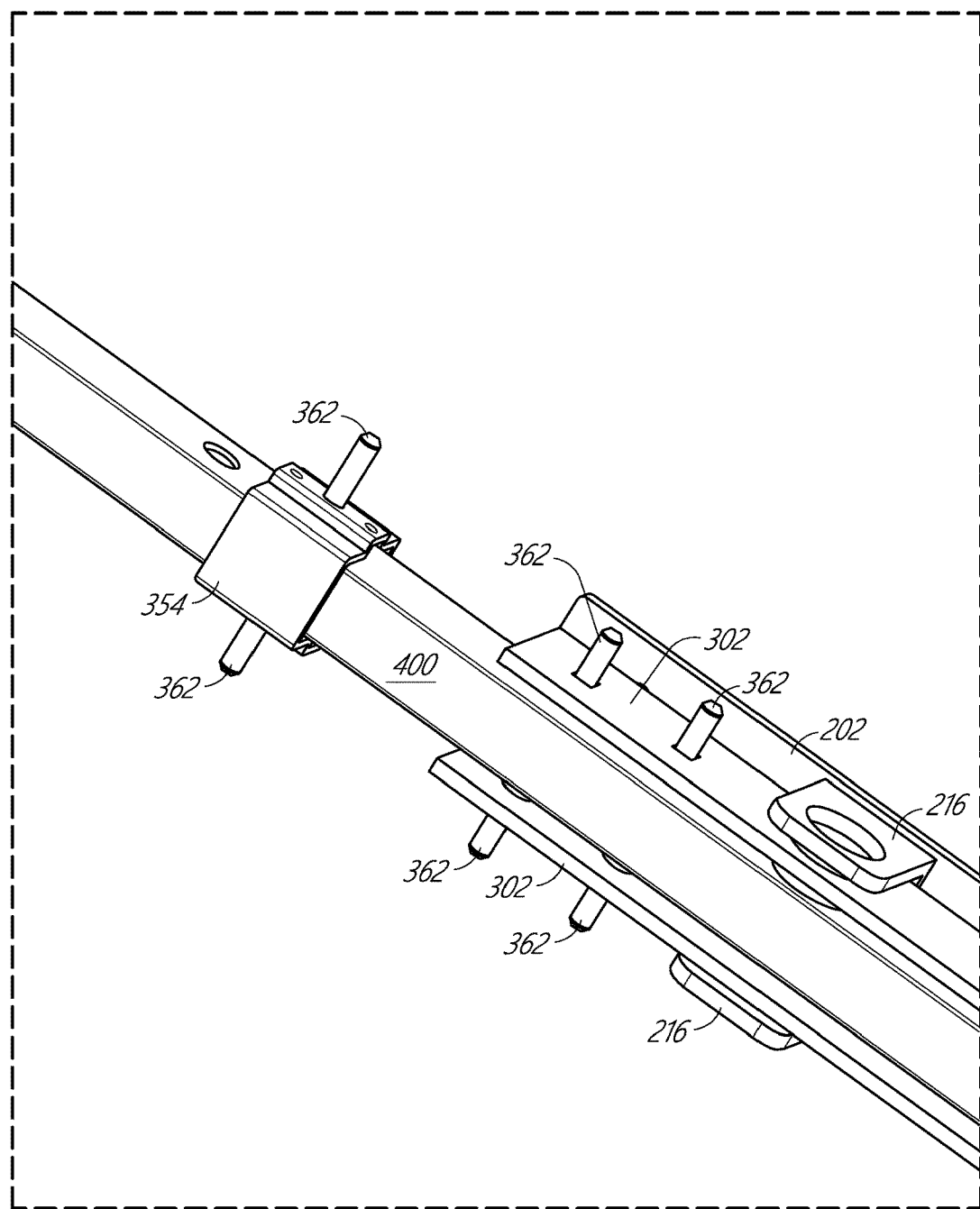
Figure 13D:
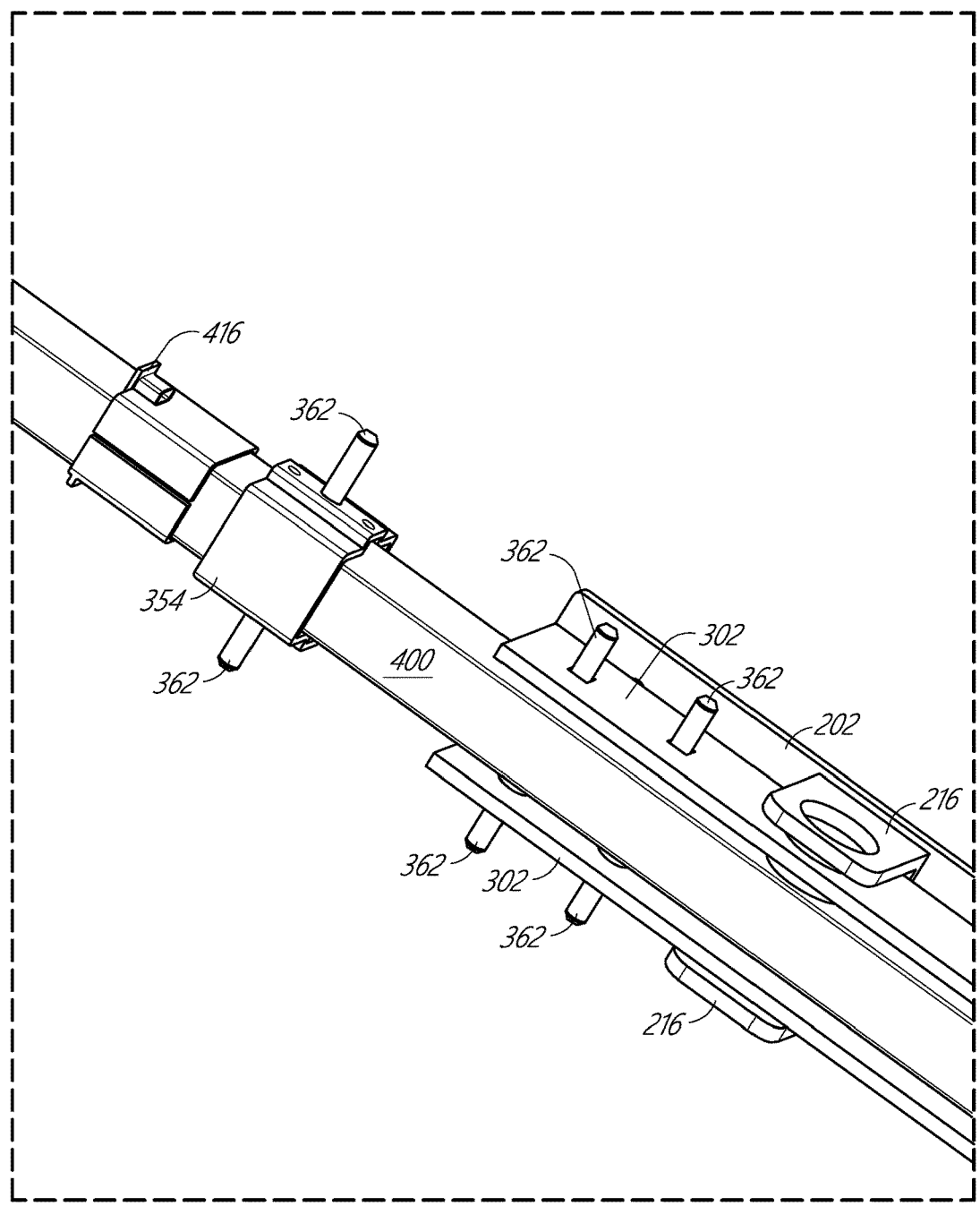
Figure 13E:
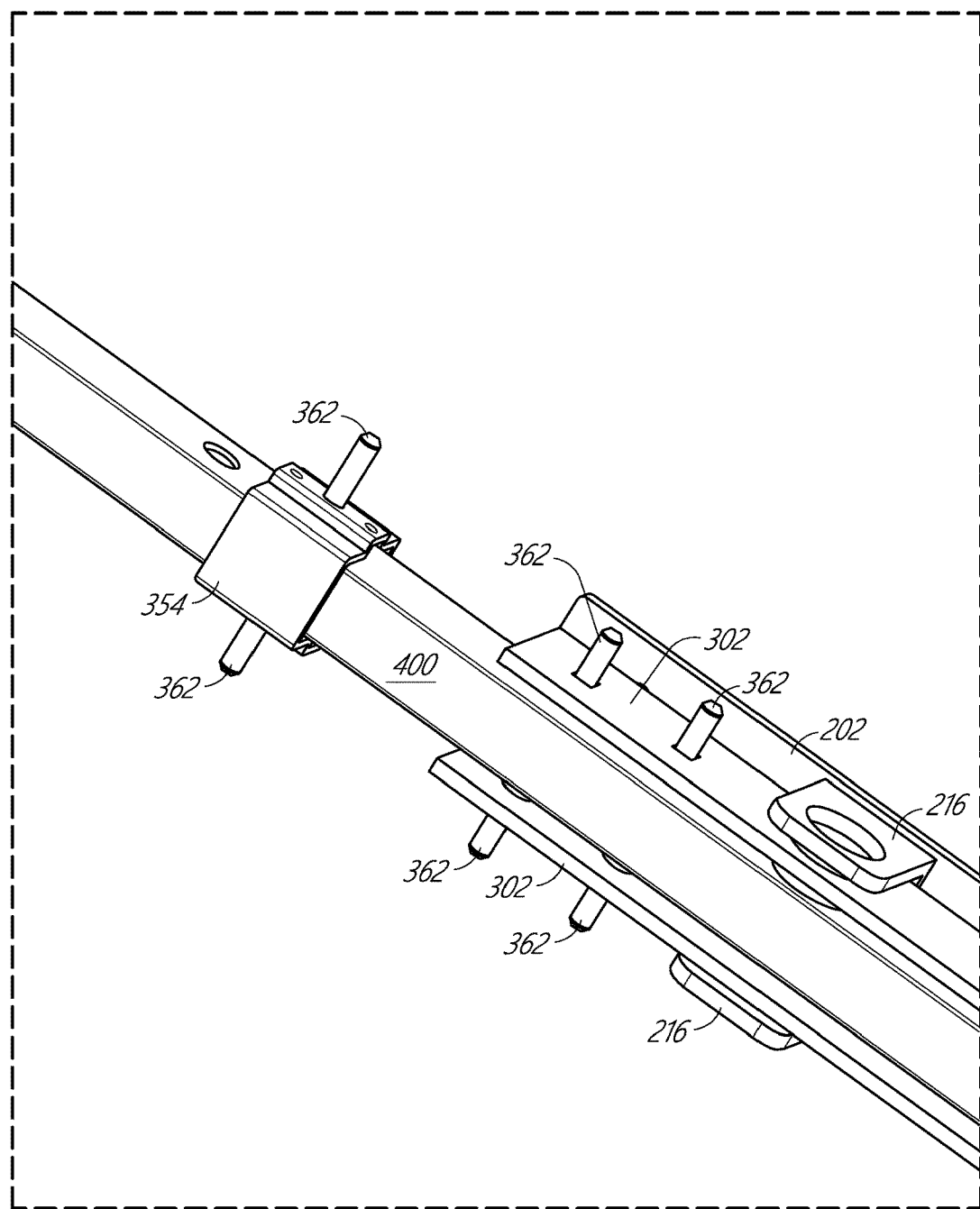
Figure 13F:
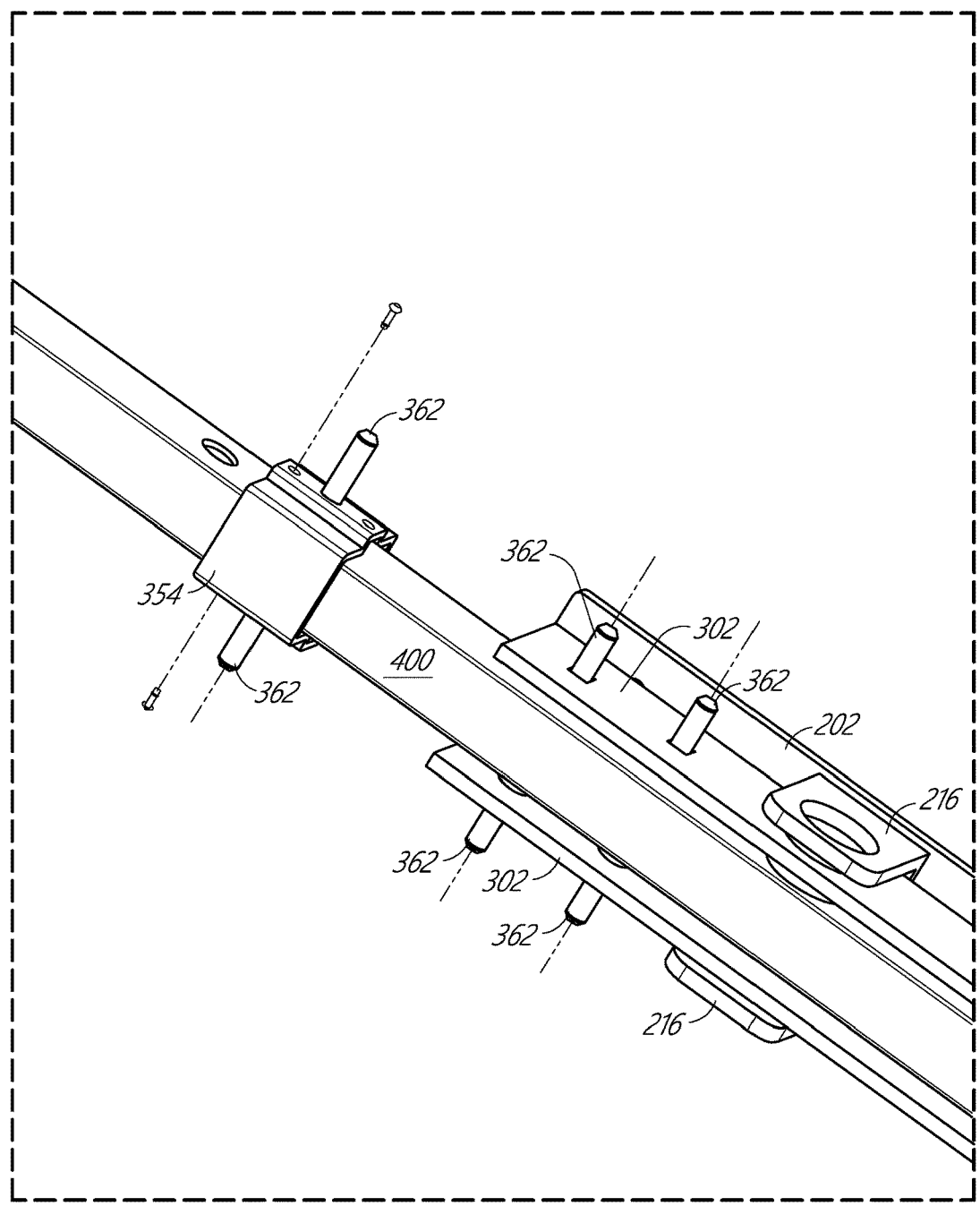
Figure 13G:
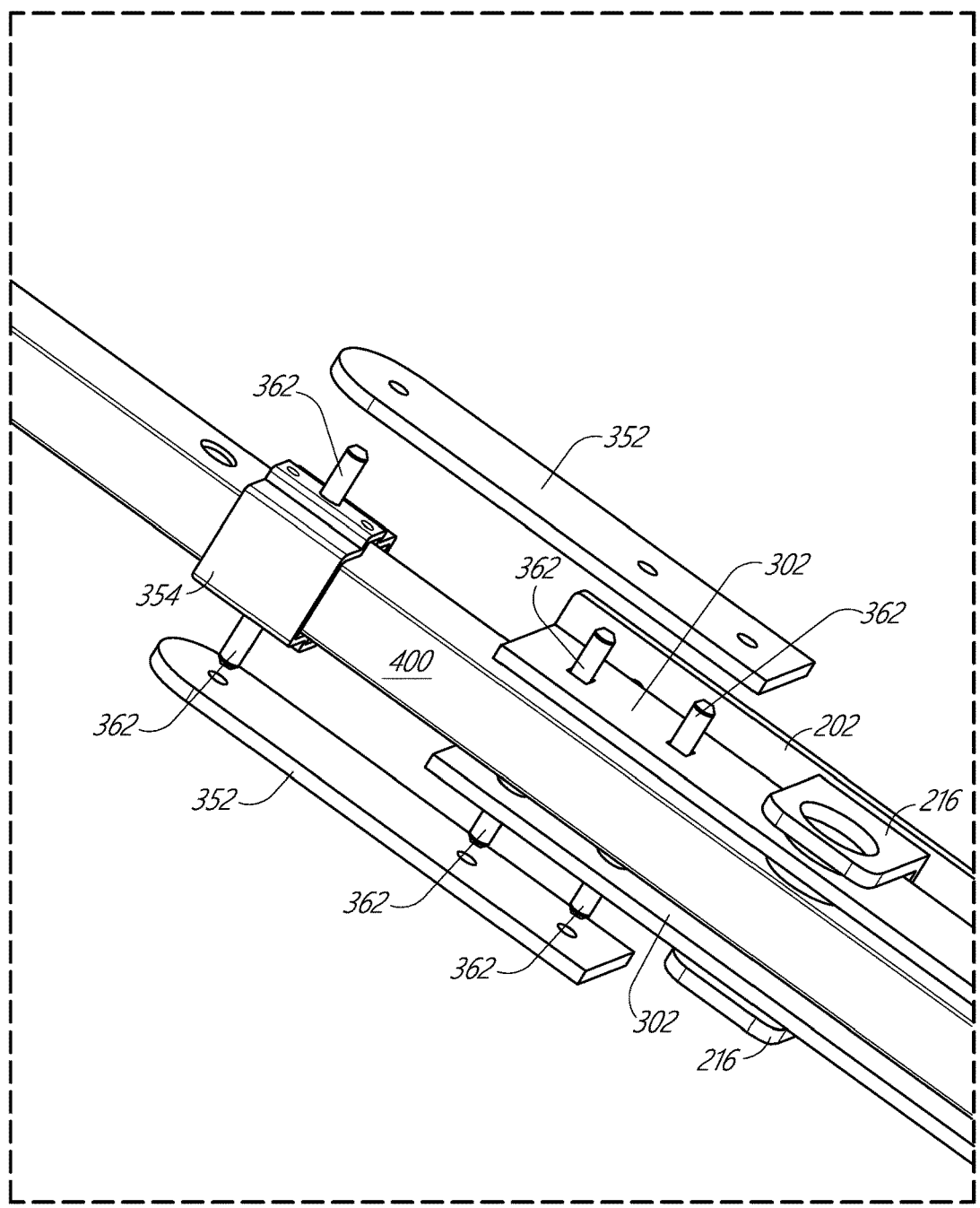
Figure 13H:
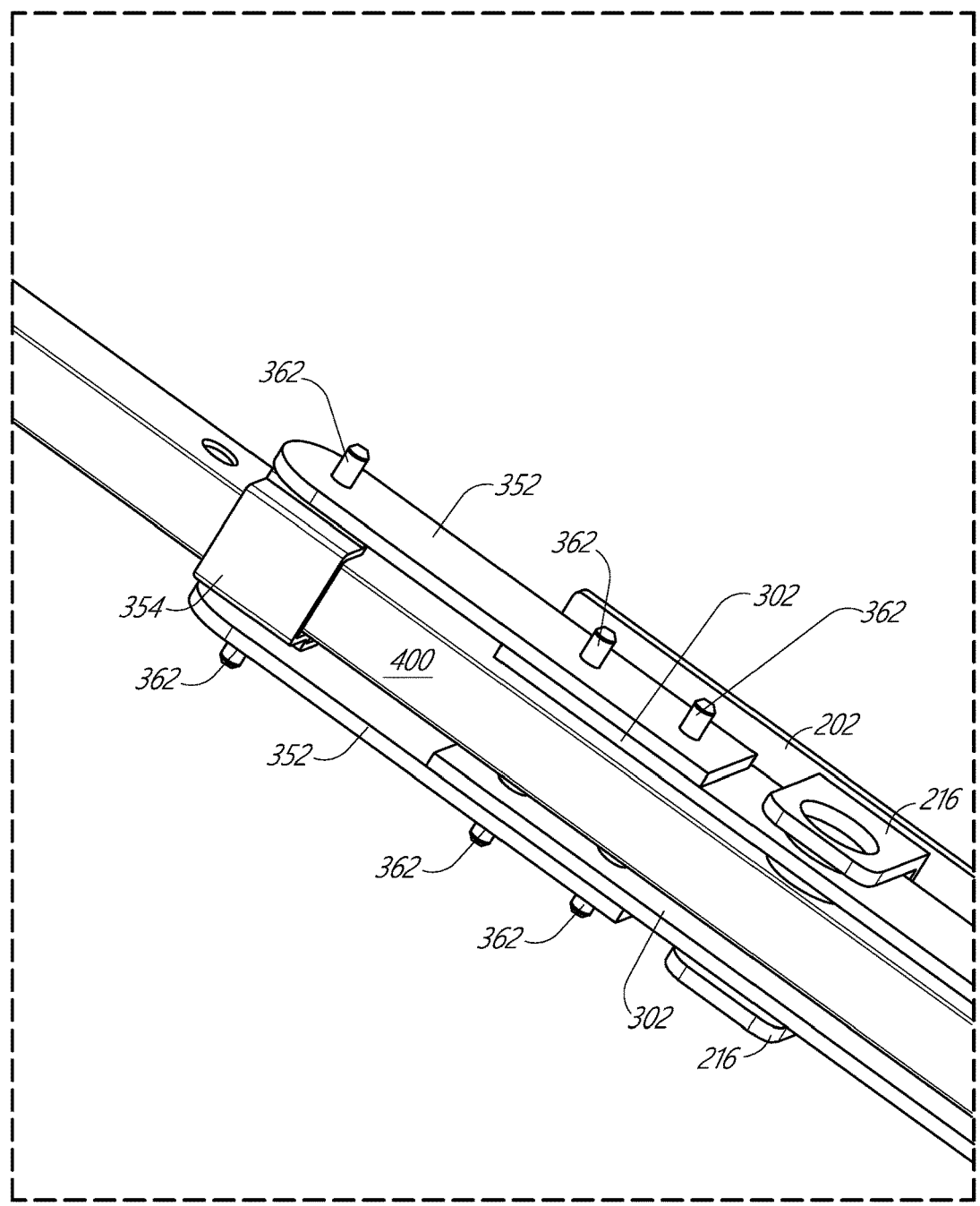
Figure 13I:
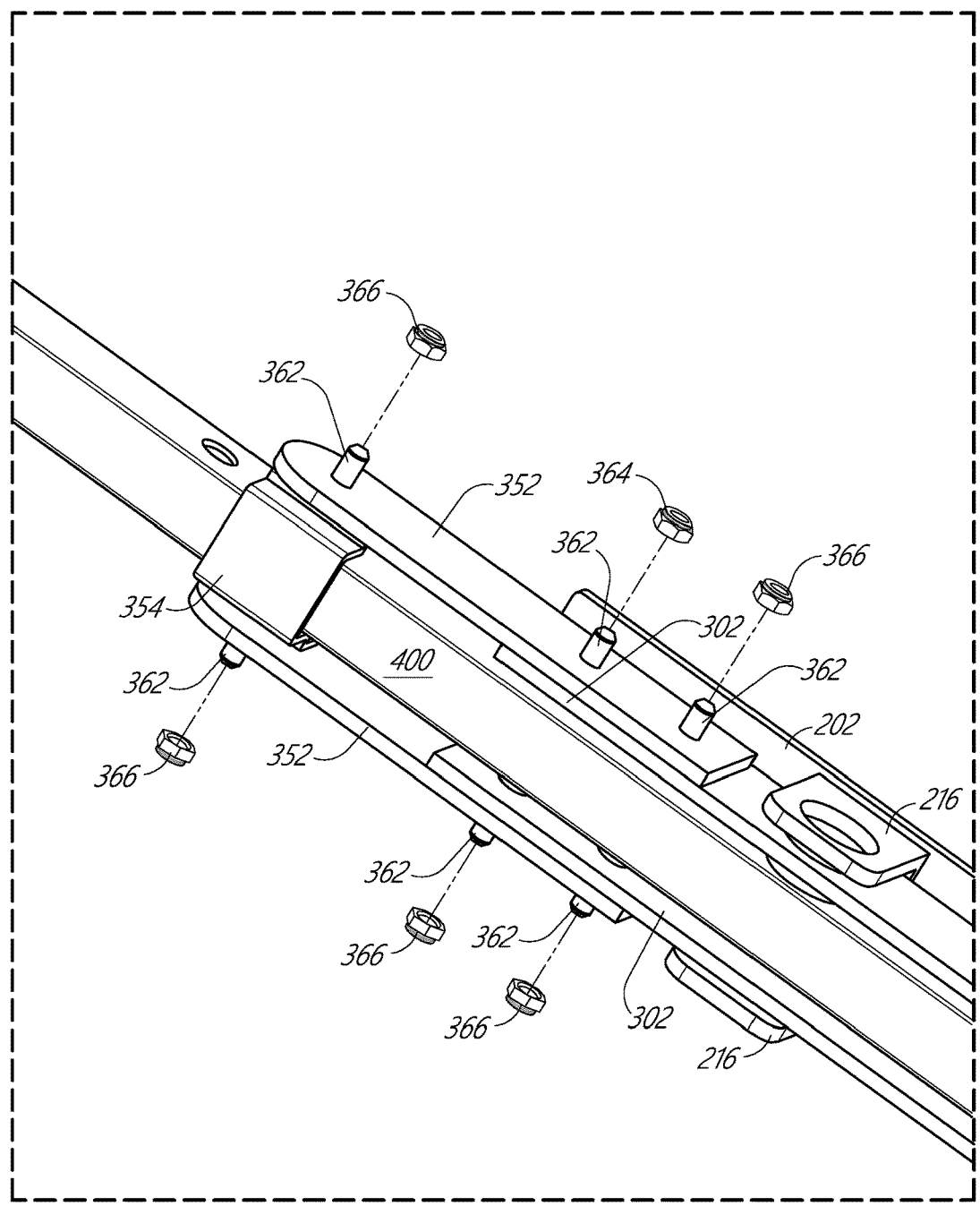
Figure 13J:
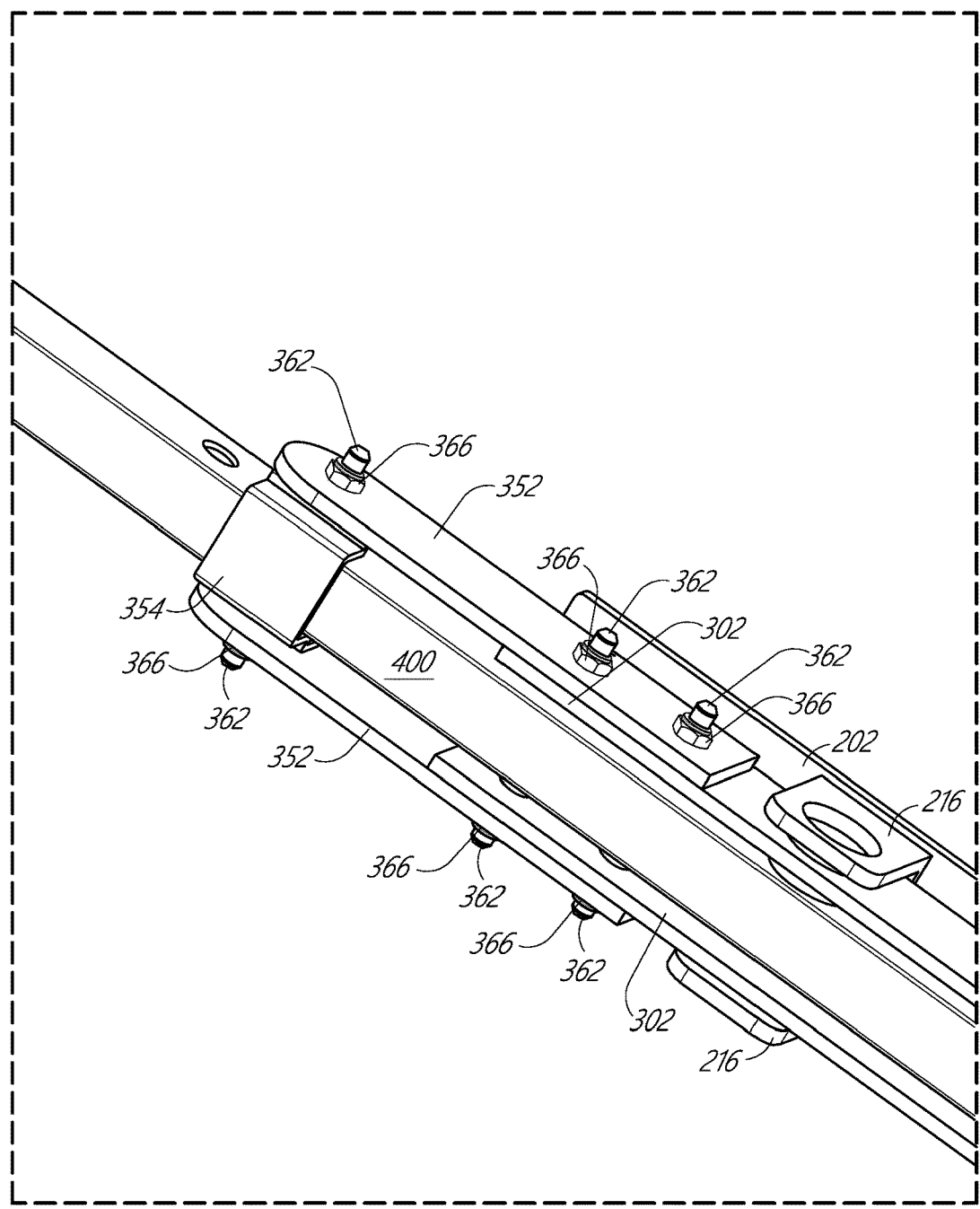

FIGS. 13A-13J depict an illustrative method of assembling a trailer lock 100 according to the present disclosure, and in particular the illustrative trailer lock 100 depicted in FIG. 1B. Starting with FIG. 13A, a swing bar 300 including lateral portions 302 and central portion 304 is placed along a vertical segment 202 of a base plate 200, between fins 212 (not shown) and lock fins 216 (if present). The hollow opening of box 354 is aligned with the channel defined by the lateral portions 302 and central portion 304 of the swing bar 300. As shown in FIG. 13B, rivets 362 are installed through holes in the swing bar 300's lateral portions 302. Rivets 362 are also installed through holes in box 354. As shown in FIG. 13C, an engagement bar 400 is then inserted through the box 354 such that it passes into the channel defined by lateral portions 302 and the central portion 304 (obscured by the engagement bar 400 in FIG. 13C). As shown in FIG. 13D, a polymer bushing 416 is slid down the exterior of the engagement bar 400 until it sits within the box 354, as shown in FIG. 13E. Once the bushing 416 has been placed within the box 354, it is screwed in place to the box with screws 364, as shown in FIG. 13F. As shown in FIG. 13G, extensions 352, which have holes corresponding to the locations of rivets 362, are placed over the rivets 362 and brought into contact with the exteriors of box 354 and lateral portions 302 as shown in FIG. 13H. Finally, as shown in FIG. 13I and FIG. 13J, nuts 364 are installed over rivets 362 in order to secure the extensions 352 to the lateral portions 302 and box 354. If engagement bar 400 is hollow, an elongated portion 502 of a lock bar 500 may be subsequently inserted through the engagement bar 400. If the lock bar 500 includes a yoke 510, it may be fastened, welded, or riveted to distal end 508 of the lock bar 500 after the elongated portion 502 of the lock bar 500 has been passed through the engagement bar 400. Notably, the illustrative trailer lock 100 shown in FIG. 1B and whose assembly is shown in FIGS. 13A-13J omits stop elements and rubber shock absorbers, though those may be provided as discussed above.

Figure 14A:
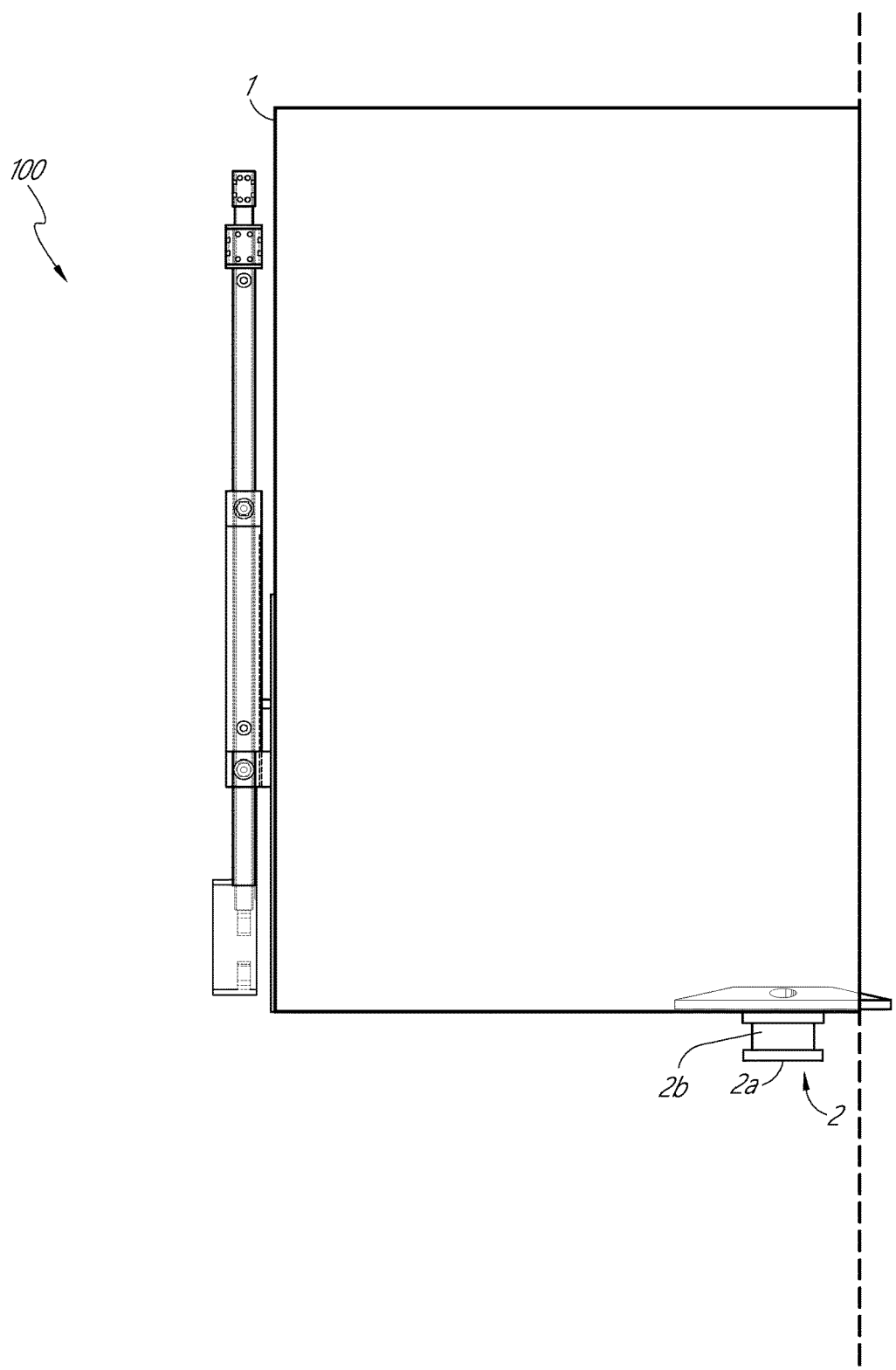
FIGS. 14A-14H are a series of environmental views depicting an illustrative method of operating a trailer lock according to the present disclosure.
Figure 14B:
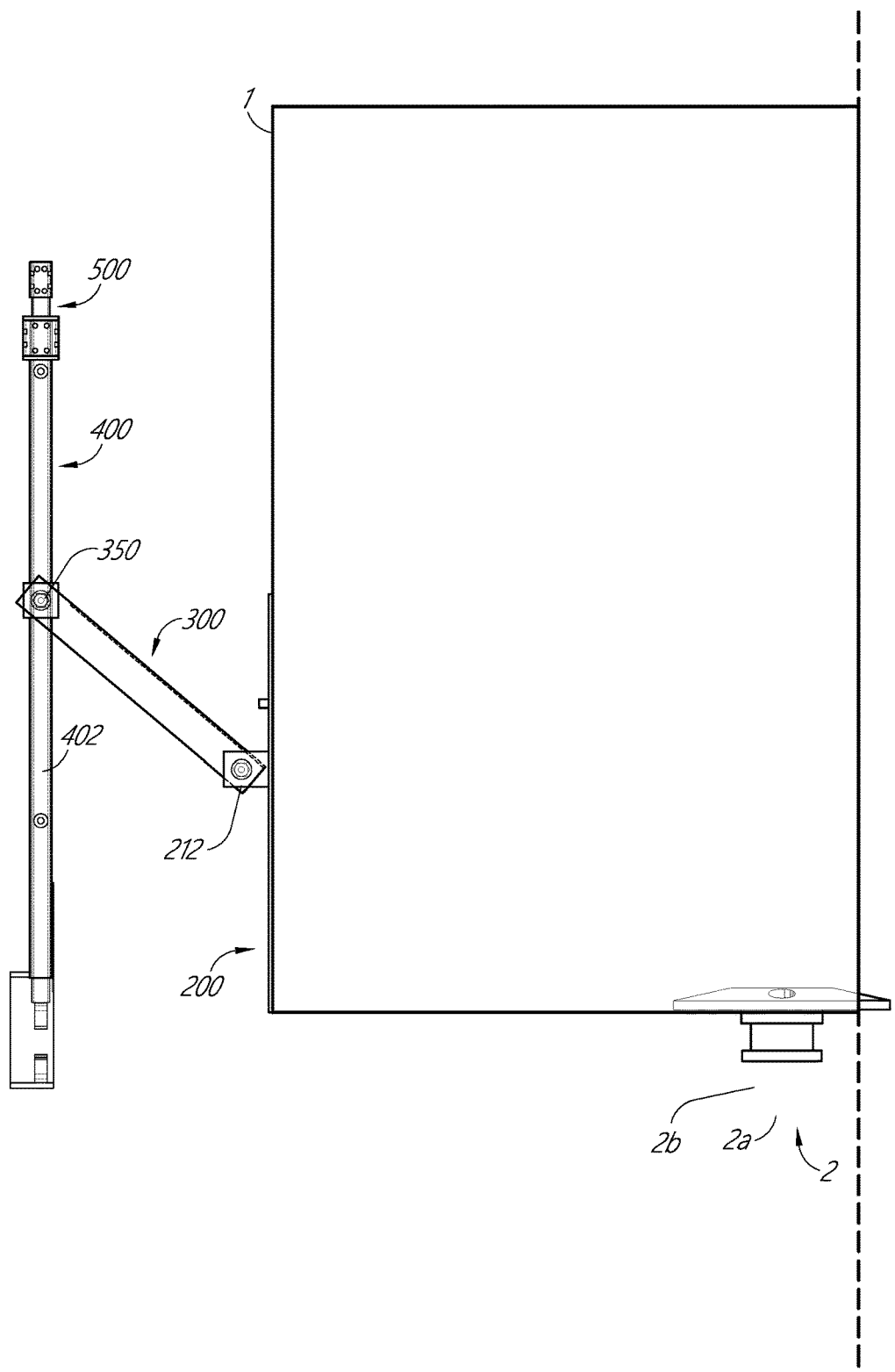
Figure 14C:
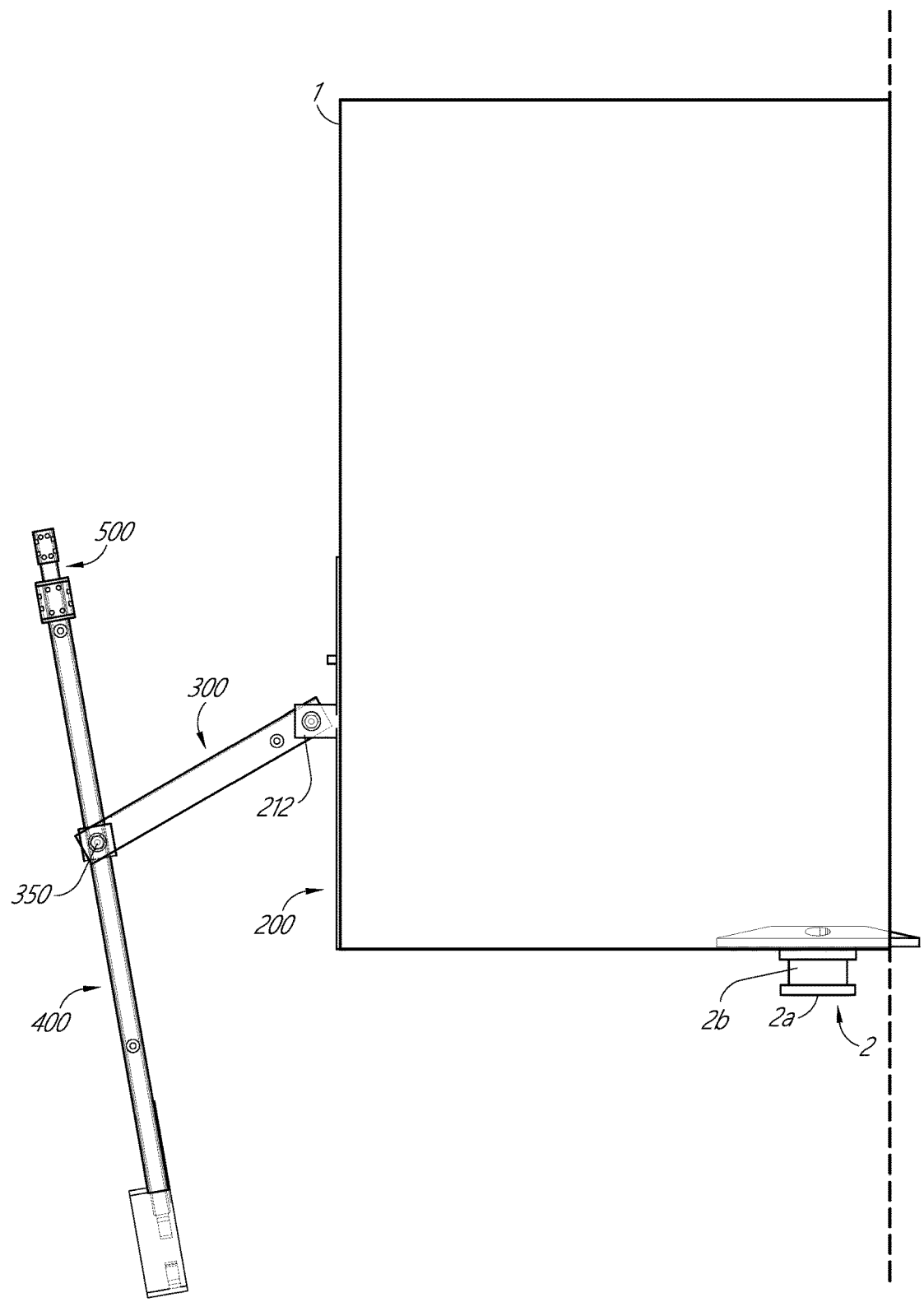
Figure 14D:
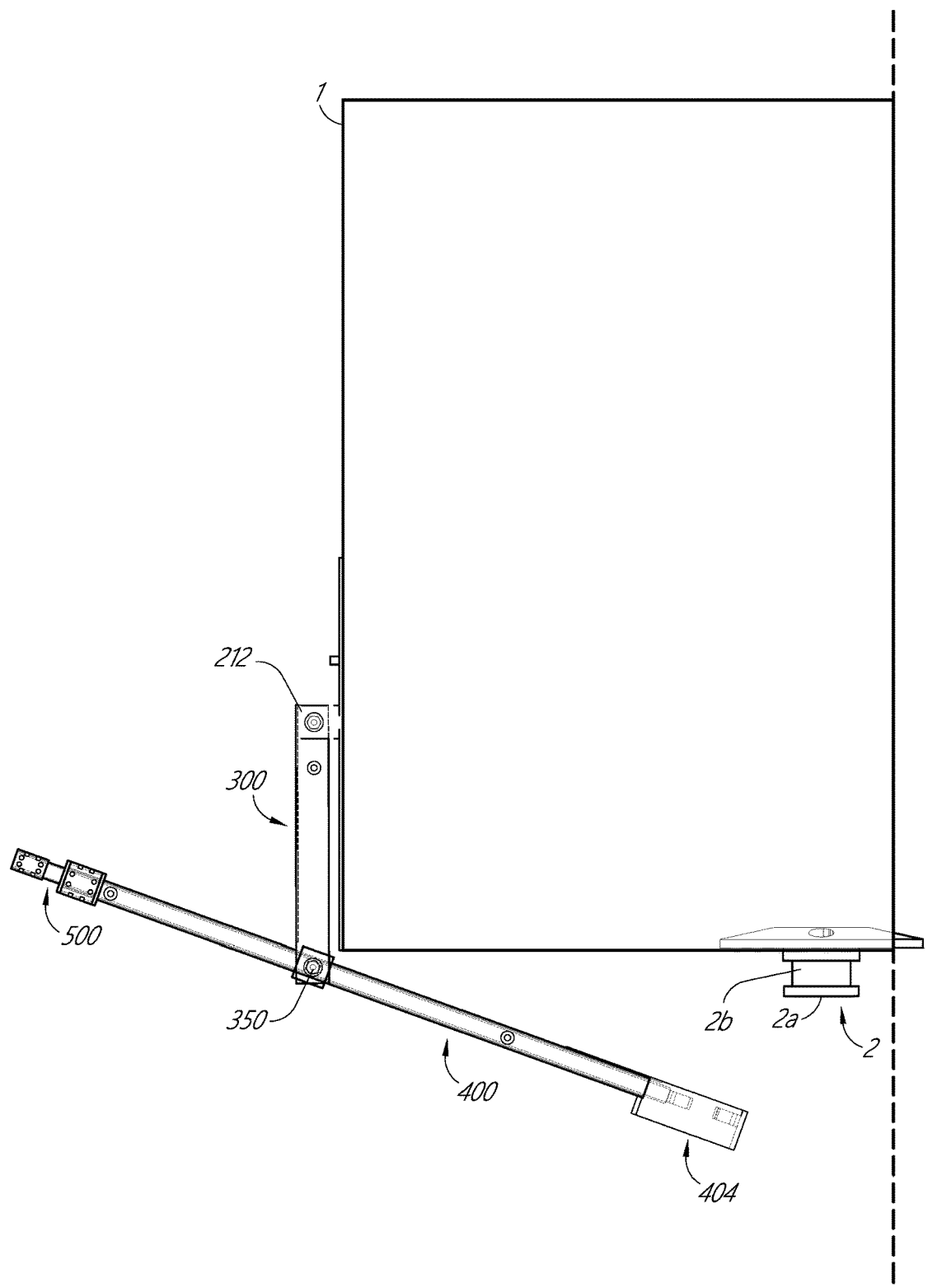
Figure 14E:
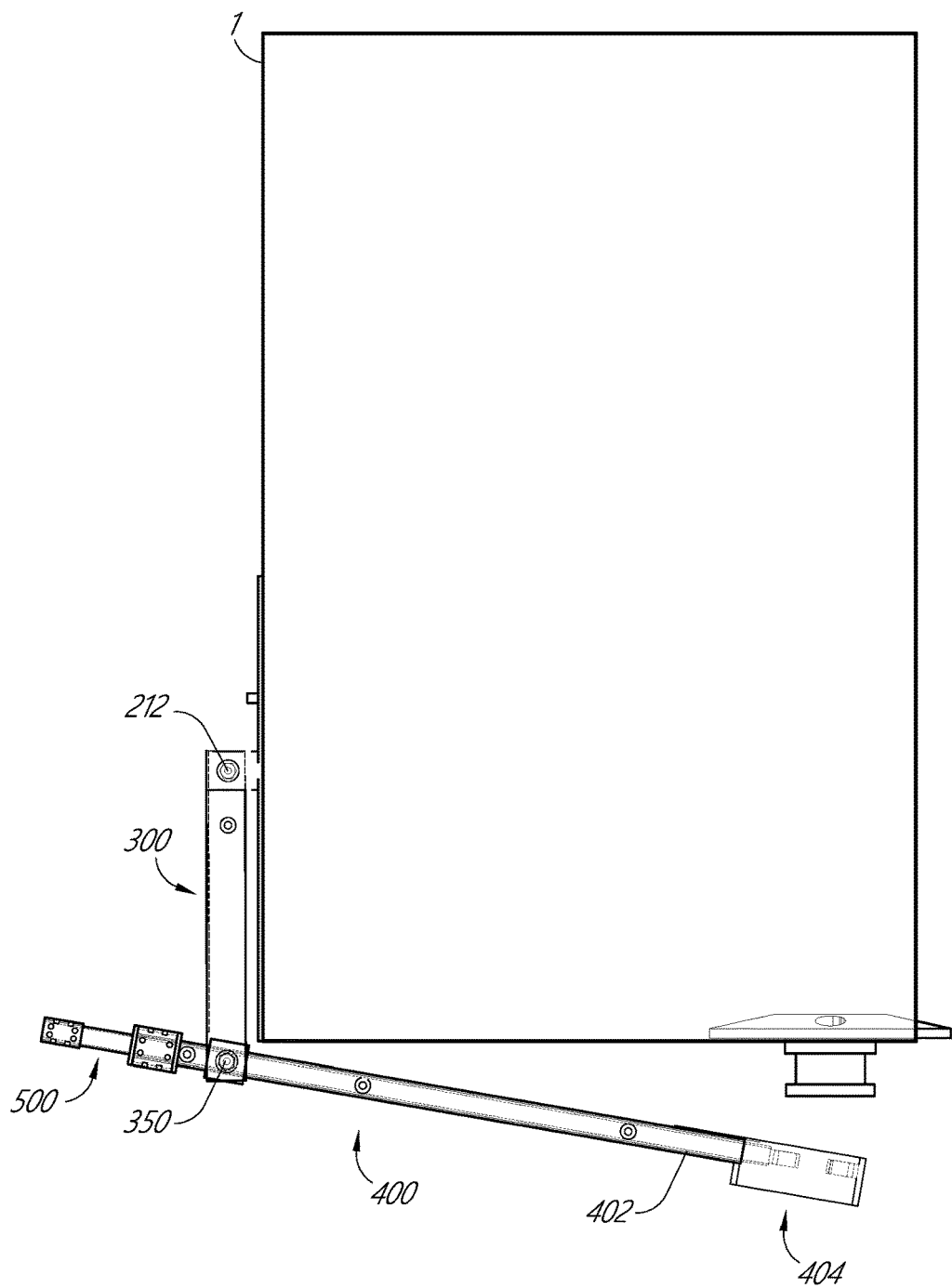
Figure 14F:
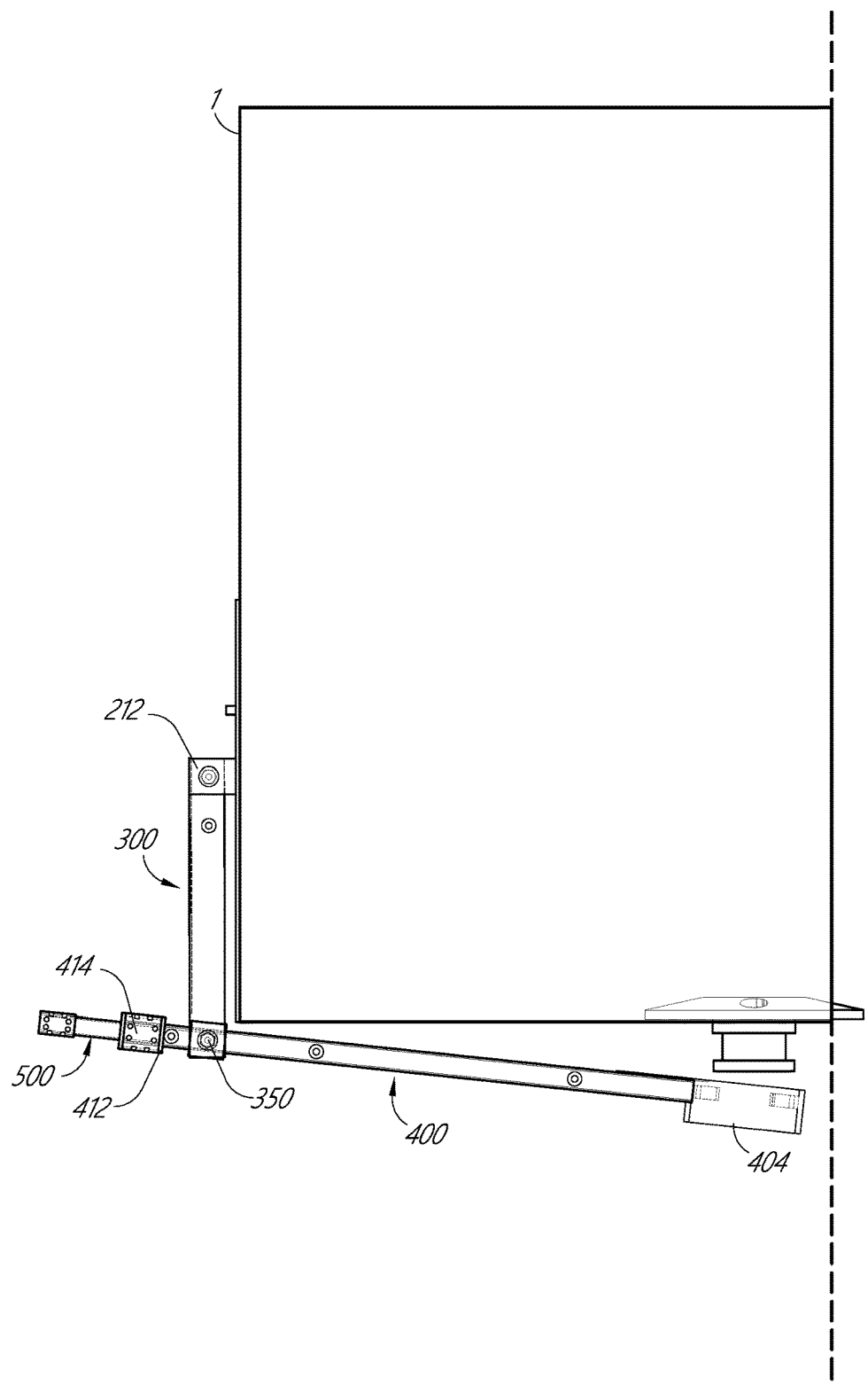
Figure 14G:
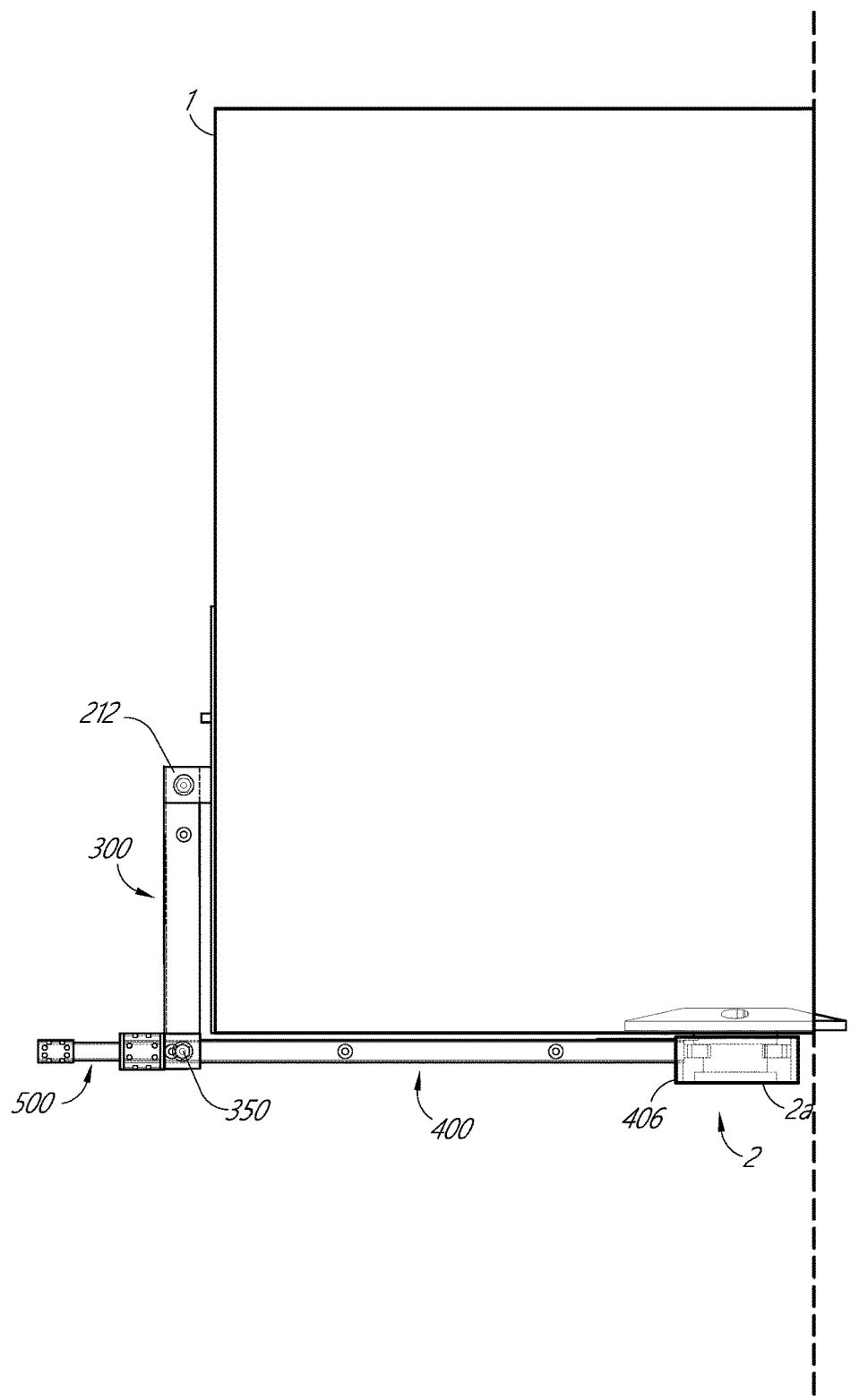

FIGS. 14A-14H depict an example method of using a trailer lock 100 mounted on a trailer wall 1 to secure a mating feature—here, a king pin 2 with an outer circumference 2a and an inner circumference 2b—against unauthorized hookups to a fifth wheel of a tractor. In FIG. 14A, the trailer lock 100 is stored in a vertical position and the king pin 2 can be connected to a fifth wheel of a tractor. In FIG. 14B, the swing bar 300 is pivoted with respect to the base plate 200, with the pivot axis passing through the fins 212 of the base plate 200 and the corresponding holes of the swing bar 300. The engagement bar 400 is pivoted away from the swing bar 300 about the pivot assembly 350 such that the elongated portion 402 of the engagement bar 400 no longer lies within the channel 306 of the swing bar 300. In FIG. 14C, the swing bar 300 continues to be pivoted with respect to the base plate 200, and the engagement bar 400 continues to be pivoted with respect to the swing bar 300 about the pivot assembly 350. In FIG. 14D, the swing bar 300 stops pivoting after completing 180 degrees of rotation. In FIG. 14E, the elongated portion 402 of the engagement bar 400 is slid through the box 354 of the pivot assembly 350 in order to bring the engagement feature 404 close to the king pin 2. In FIG. 14F, the engagement bar 400 cannot slide any further, as its rubber shock absorber 412 and stop element 414 cannot pass through the box 354 of the pivot assembly 350. In FIG. 14G, the engagement bar 400 continues to pivot with respect to the pivot assembly 350 until the ring 406 is fitted over the king pin 2, with the brace 408 above the outer circumference 2a of the king pin 2. Finally, in FIG. 14H, the lock bar 500, housed within the engagement bar 400, is slid through the engagement bar until the distal end 508 (which may optionally include a yoke 510) of the lock bar 500 is above the outer circumference 2a of the king pin 2 and/or contacts the inner circumference 2b of the king pin 2. With the brace 408 of the engagement bar 400 and the distal end 508 of the lock bar 500 over the inner circumference 2a of the king pin 2, the ring 406 is fit in place over the king pin 2, preventing a tractor from engaging its fifth wheel to the king pin 2. This illustrative method may be reversed to permit a tractor's fifth wheel to engage with the king pin 2.

FIG. 15 shows an illustrative locking mechanism that can be included in a trailer lock 100. The trailer lock 100 can include a first passage that is defined by holes 602a provided in the swing arm 300, the lock fin 216 of the vertical portion 208 of the base plate 200, the elongated portion 402 of the engagement bar 400, and the lock bar 500. When the trailer lock 100 is in the position shown in the left drawing of FIG. 15, each of the holes 602a align such that a removable bullet lock 700 can be inserted through the holes 602a of (from outside to inside) the lock fin 216, the swing bar 300, the elongated portion 402 of the engagement bar 400, and the lock bar 500.

The trailer lock 100 can also include a second passage that is defined by holes 602b provided in the elongated portion 402 of the engagement bar 400 and the lock bar 500, as shown in the right drawing of FIG. 15. When the trailer lock 100 is in the position shown in the right drawing of FIG. 15 (i.e., when the engagement feature 404 and lock bar 500 are fit to the mating feature of the trailer), each of the holes 602b align such that a removable bullet lock 700 can be inserted through the holes 602b of (from outside to inside) the elongated portion 402 of the engagement bar 400 and the lock bar 500.

Figure 16:
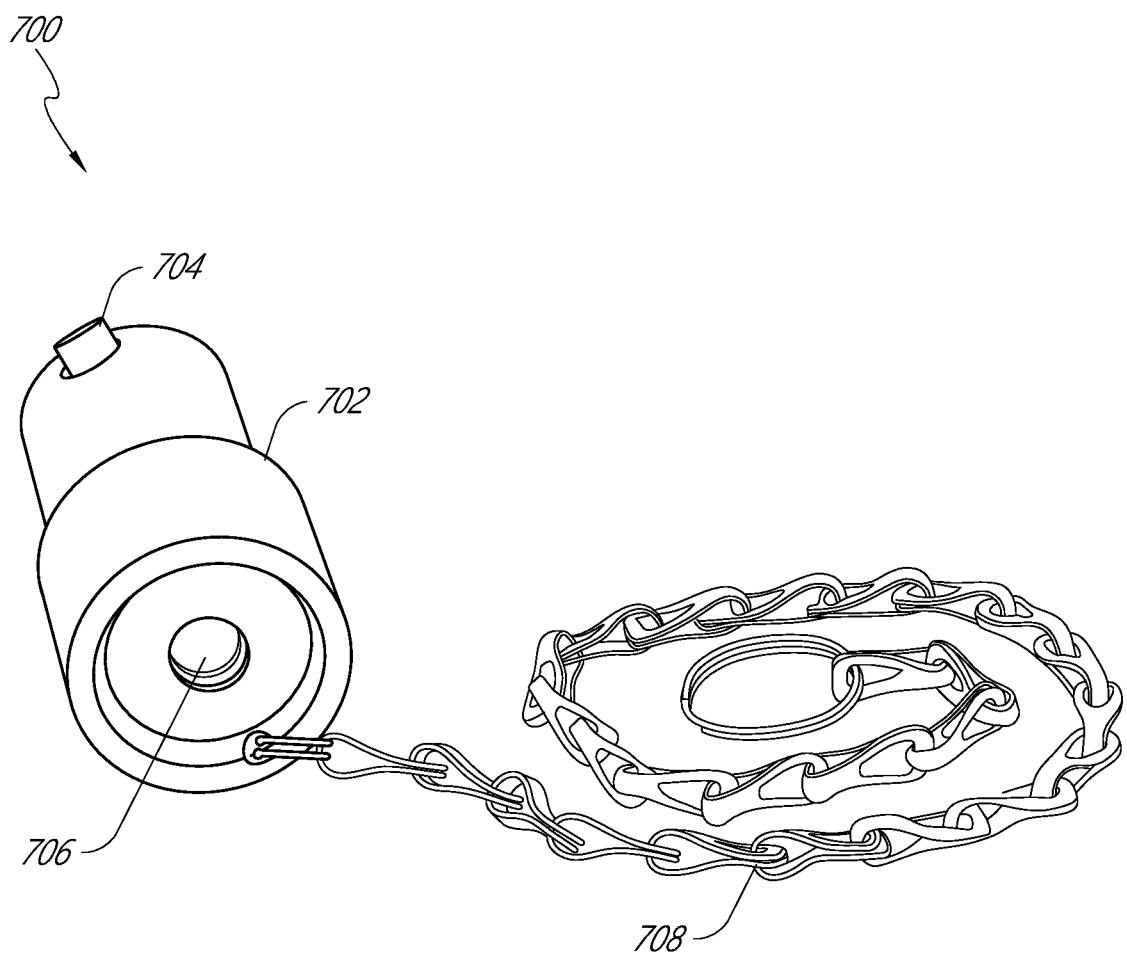
FIG. 16 is an environmental view of an illustrative bullet lock for use with the illustrative locking assembly shown in FIG. 15.

As shown in FIG. 16, a bullet lock 700 includes a cylindrical body 702 that houses two flanges 704 that can be selectively extended out of the body 702 and retracted into the body 702 by placing a key in the keyhole 706 and turning the key. In some embodiments, the diameter of the body 702 is selected so that its cross-sectional area is approximately equal to the cross-sectional area defined by holes 602a and/or 602b. When the flanges 704 are extended, the flanges 704 prevent the bullet lock 700's removal from the passage. Any shape can be used for the bullet lock body 702 and holes 602a and 602b so long as the shape of the bullet lock body 702 is compatible with the holes 602a and 602b. In the example shown in FIG. 15 and FIG. 16, the bullet lock body 702 is cylindrical and the holes 602a and 602b are circular. Likewise, any number of flanges 704 can be used. An example of a suitable bullet lock 700 for use with the locking mechanism shown in FIG. 15 is the BULLET-LOK® lock sold by BABACO Alarm Systems, Inc. of Moonachie, N.J.

Returning to the left drawing of FIG. 15, when the bullet lock 700 is positioned through the holes 602*a*, the bullet lock 700 prevents the swing arm 300, the engagement bar 400, and the lock bar 500 from moving while the trailer lock 100 is being stored in a vertical position to permit a tractor to engage with a king pin or other mating feature of a trailer. The bullet lock 700 can then be locked with a key in order to extend flanges 704 to prevent the bullet lock 700's removal from the holes 602*a*. In particular, the flanges 704, when extended, would abut the interior of the lock bar 500 to prevent the removal of the bullet lock 700.

Figure 14H:
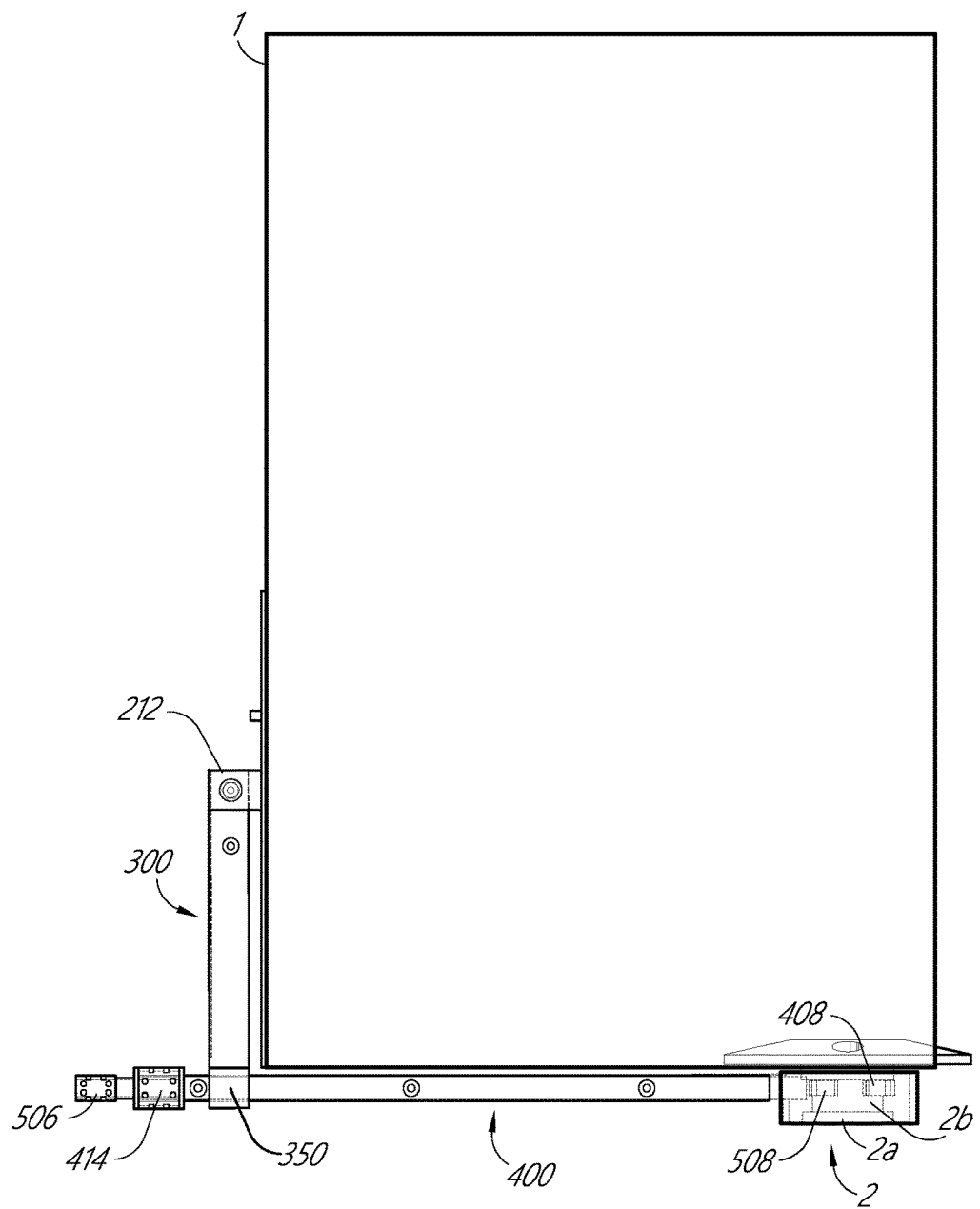

With reference to the right drawing of FIG. 15, (which also corresponds to the position of the trailer lock 100 shown in FIG. 14H), when the bullet lock 700 is positioned through the holes 602*b*, the lock bar 500 cannot be slid away from the mating feature of the trailer. Because the lock bar 500 cannot be slid away from the mating feature of the trailer in this position, the engagement feature 404 cannot be removed from its position over the mating feature of the trailer, either, and thus the engagement bar 400 cannot be slid or pivoted away from the mating feature of the trailer. The bullet lock 700 can then be locked with a key in order to extend flanges 704 to prevent the bullet lock 700's removal from the holes 602*b*. In particular, the flanges 704, when extended, would abut the interior of the lock bar 500 to prevent the removal of the bullet lock 700.

In some embodiments, a single bullet lock 700 is used for both sets of holes 602*a* and 602*b*, as it is not necessary to have bullet locks 700 in sets of holes 602*a* and 602*b* at the same time. For example, a single bullet lock 700 may be chained to the trailer wall 1 on which the trailer lock 100 is mounted via chain 708, as shown in FIG. 16. The chain is long enough so that the bullet lock 700 can be placed through either hole 602*a* when the trailer lock 100 is in the position shown in the left drawing of FIG. 15 or hole 602*b* when the trailer lock 100 is in the position shown in the right drawing of FIG. 15. However, multiple bullet locks 700 can be used if desired, so holes 602*a* and 602*b* need not be the same size or shape.

Figure 17:
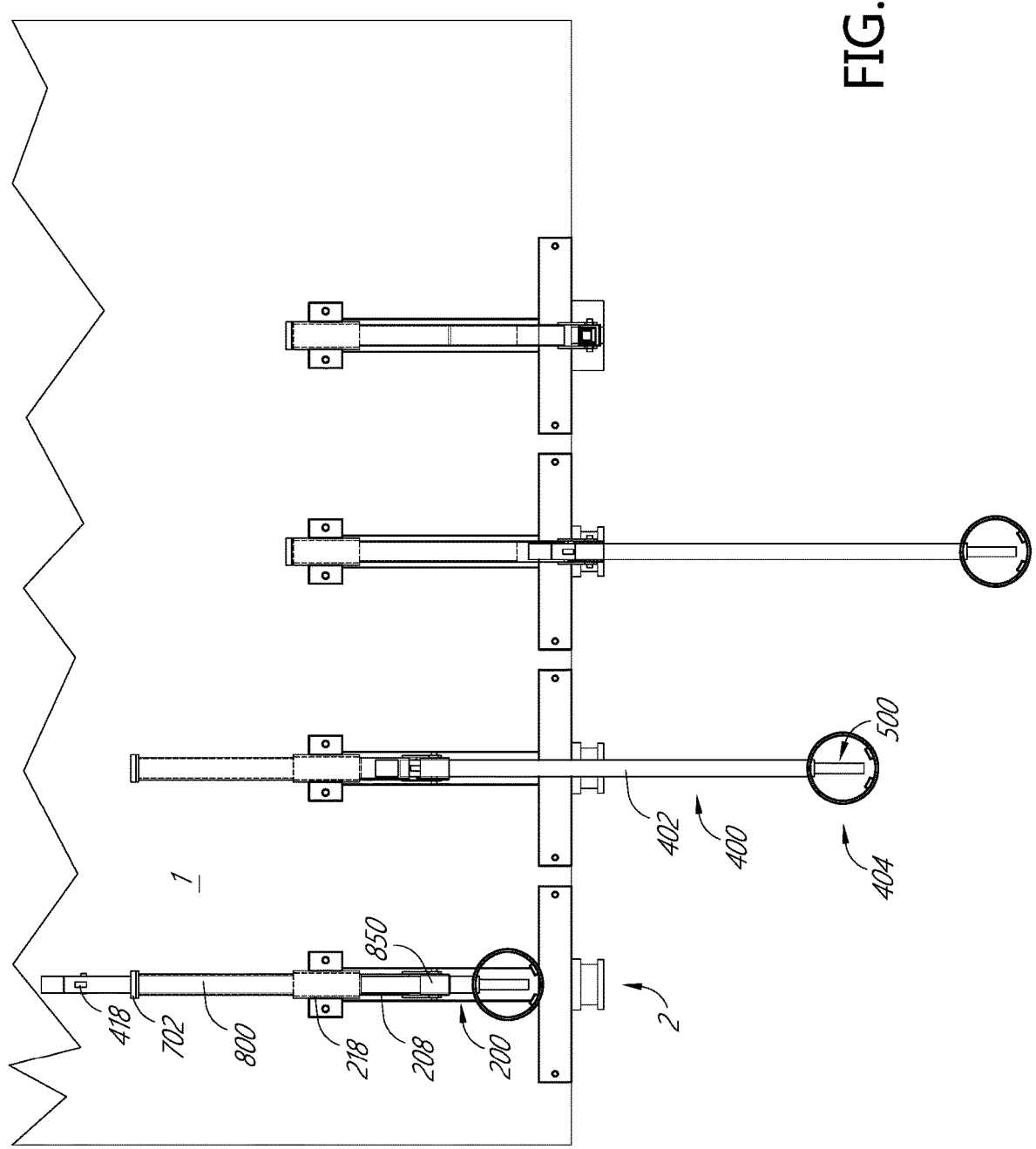
FIG. 17 is a series of environmental views depicting an alternative embodiment of a trailer lock according to the present disclosure.

Another example implementation of a trailer lock and trailer lock assembly according to the present disclosure is shown in the series of drawings in FIG. 17. Rather than employing a pivoting swing bar, the example implantation shown in the series of drawings in FIG. 17 employs an extension bar 800 that houses the engagement bar 400. The extension bar 800 passes vertically through a tube 218 mounted on the base plate 200's vertical portion 208. The extension bar 800 includes a box pivot assembly 850 like the pivot assembly 350 shown in FIG. 5. When the trailer lock is to be deployed to a locked position, as shown from left to right in the drawings of FIG. 17, the engagement arm 400 is lowered through the extension bar 800 and the extension arm 800 is lowered through the base plate's tube 218. The stop element 702 provided on the top of the extension bar 800 prevents the extension arm 800 from passing through the tube 716 in its entirety. The engagement bar 400 is then pivoted about the extension arm 800's pivot assembly 850 to fit the engagement bar 400's engagement feature 404 to the mating feature of the trailer, which in FIG. 17 is a king pin 2. Flanges 418 can be included on the engagement bar 400. Those flanges 418 can be wider than the box of the pivot assembly 850 to prevent the engagement bar 400 from passing completely through the pivot assembly 850. The elongated portion 402 of the engagement bar 400 can also be hollow to permit a lock bar 500 to pass therethrough.

Many modifications to the trailer lock and trailer lock assembly described herein are possible and within the scope of the present disclosure. Dimensions and materials for any or all of the components of the trailer lock may generally be selected and varied as desired or required. In some embodiments, one or more of the components of a trailer lock 100, such as the base plate 200, swing bar 300, engagement bar 400, and lock bar 500 are made of anodized aluminum, cold steel, stainless steel, or hardened steel. The engagement bar 400 and lock bar 500 may also be coated with PTFE to facilitate movement of the lock bar 500 within the engagement bar 400. The rubber shock absorbers 412 and 504 may be made of a shock-absorbing material other than rubber, or optionally omitted entirely.

A description listing the dimensions and materials for an example implementation of a trailer lock is set forth in Appendix A of U.S. Provisional Patent App. No. 62/365,357, filed on Jul. 21, 2016, which is incorporated by reference. A description listing the dimensions and materials another example implementation of the trailer lock is attached hereto as Appendix B of U.S. Provisional Patent App. No. 62/365, 357, which is also incorporated by reference.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments. As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, the term "or" is used in its inclusive sense (and not in its exclusive sense) so that when used, for example, to connect a list of elements, the term "or" means one, some, or all of the elements in the list.

Although certain preferred embodiments and examples are disclosed herein, inventive subject matter extends beyond the specifically disclosed embodiments to other alternative embodiments and/or uses, and to modifications and equivalents thereof. Thus, the scope of the disclosure is not limited by any of the particular embodiments described herein. For example, in any method disclosed herein, the acts or operations of the method can be performed in any suitable sequence and are not necessarily limited to any particular disclosed sequence. Various operations can be described as multiple discrete operations in turn, in a manner that can be helpful in understanding certain embodiments; however, the order of description should not be construed to imply that these operations are order dependent.

Additionally, the structures described herein can be embodied as integrated components or as separate components. In some embodiments, the structures described herein can be provided as a kit in which some or all of the components of those embodiments are provided separately for assembly or use. For example, a kit for implementing a trailer lock system as described herein can include a base plate capable of being mounted to a wall of a trailer; a swing bar capable of being pivotally connected to the base plate; an engagement bar capable of being pivotally connected to the swing bar, the engagement bar comprising an engagement feature capable of fitting to a mating feature of the trailer; and a lock bar capable of being slideably coupled to the engagement bar. The kit can also include one or more bullet locks and a chain for mounting the one or more bullet locks to a wall of a trailer; a yoke that can be fastened to a distal end of an elongated portion of the lock bar; and a fastener (e.g., a screw or bolt) for fastening the yoke to the distal end of the elongated portion of the lock bar.

For purposes of comparing various embodiments, certain aspects and advantages of these embodiments are described. No single embodiment necessarily includes all of those aspects or advantages. Thus, for example, various embodiments can be carried out in a manner that achieves or optimizes one advantage or group of advantages as taught herein without necessarily achieving other aspects or advantages disclosed herein. No single feature (or group of features) is necessary or indispensable for any embodiment.

All modifications and variations are intended to be included herein within the scope of this disclosure and protected by the following claims, which describe illustrative configurations and implementations of the subject matter disclosed herein.

What is claimed is:

1. A trailer lock assembly comprising:
    a base plate mounted to a front exterior wall of a trailer by one or more fasteners;
    a swing bar pivotally connected to the base plate at a proximal end of the swing bar;
    a hollow engagement bar pivotally connected to the swing bar at a distal end of the swing bar, the hollow engagement bar comprising a ring capable of fitting to a king pin of the trailer; and
    a lock bar slideably coupled to and at least partially housed within the hollow engagement bar, the lock bar comprising an elongated portion and a yoke that fits within the ring of the hollow engagement bar.

2. The trailer lock assembly of claim 1, wherein the ring further comprises one or more bracing elements.

3. The trailer lock assembly of claim 1, wherein the engagement bar further comprises one or more gussets welded to the ring.

4. The trailer lock assembly of claim 1, wherein:
    the elongated portion of the lock bar comprises a distal end configured to receive a fastener;
    the yoke is configured to receive the fastener; and
    the yoke is fastened to the distal end via the fastener.

5. The trailer lock assembly of claim 4, wherein the lock bar further comprises a stop element located at a proximal end of the lock bar.

6. The trailer lock assembly of claim 1 further comprising a PTFE coating disposed on an interior surface of the hollow engagement bar.

7. The trailer lock assembly of claim 1 further comprising a PTFE coating disposed on an exterior surface of the lock bar.

8. A trailer lock comprising:
    a base plate capable of being mounted to a wall of a trailer;
    a first bar operably connected to the base plate;
    a hollow engagement bar pivotally connected to the first bar, the engagement bar comprising an engagement feature capable of fitting to a mating feature of the trailer; and
    a lock bar at least partially housed within the engagement bar, wherein the lock bar is slideably coupled to the engagement bar to permit the lock bar to slide along a length of an elongated portion of the engagement bar, the lock bar comprising a yoke located at a distal end of the lock bar.

9. The trailer lock of claim 8, wherein the first bar is operably connected to the base plate by a pivotal connection.

10. The trailer lock of claim 8, wherein the base plate further comprises a tube through which the first bar passes, and wherein the first bar is operably connected to the base plate by being slideably coupled to the tube.

11. The trailer lock of claim 8, wherein the lock bar further comprises a stop element located at a proximal end of the lock bar.

12. The trailer lock of claim 8 further comprising means for restricting the movement of the lock bar with respect to the engagement bar.

13. The trailer lock of claim 8, wherein the engagement feature comprises a ring.

14. The trailer lock of claim 13, wherein the ring further comprises one or more bracing elements.

15. A trailer lock kit comprising:
    A base plate capable of being mounted to a wall of a trailer;
    a swing bar capable of being pivotally connected to the base plate;
    a hollow engagement bar capable of being pivotally connected to the swing bar, the engagement bar comprising an engagement feature capable of fitting to a mating feature of the trailer;
    a lock bar capable of being at least partially housed within the engagement bar and slideably coupled to the engagement bar to permit the lock bar to slide along a length of an elongated portion of the engagement bar, the lock bar comprising an elongated portion having a distal end; and
    a yoke capable of being fastened to the distal end of the elongated portion of the lock bar.

16. The trailer lock kit of claim 15, wherein the lock bar further comprises a stop element located at a second end of the lock bar.

17. The trailer lock kit of claim 15, wherein the engagement feature comprises a ring.

18. The trailer lock kit of claim 17, wherein the ring further comprises one or more bracing elements.

19. The trailer lock kit of claim 15 further comprising a bullet lock, said bullet lock comprising:
    a cylindrical body, the cylindrical body defining a keyhole; and
    one or more flanges that are selectively retractable into and selectively extendable out of the cylindrical body.

20. The trailer lock kit of claim 15 further comprising a fastener capable of fastening the yoke to the distal end of the elongated portion of the lock bar.

21. A method of operating a trailer lock assembly that comprises a trailer lock, the trailer lock comprising a swing bar pivotally connected to a base plate mounted on a wall of a trailer, an engagement bar pivotally connected to the swing bar and comprising an engagement feature capable of fitting to a mating feature of a trailer, and a lock bar slideably coupled to the engagement bar, the method comprising:
    pivoting the swing arm with respect to the base plate;
    pivoting the engagement bar with respect to the swing arm to fit the engagement feature to the mating feature of the trailer; and
    sliding the lock bar with respect to the engagement bar to bring a portion of the lock bar in contact with the mating feature of the trailer.

22. The method of claim 21 further comprising, after sliding the lock bar with respect to the engagement bar to bring the portion of the lock bar in contact with the mating feature of the trailer, preventing the lock bar from sliding with respect to the engagement bar.

23. The method of claim 22, wherein preventing the lock bar from sliding with respect to the engagement bar comprises locking the engagement bar to the lock bar with a bullet lock.

24. The method of claim 21, wherein the lock bar further comprises a yoke, and wherein the portion of the lock bar brought into contact with the mating feature of the trailer comprises the yoke.

25. The trailer lock of claim 8, wherein the engagement feature capable of fitting to the mating feature of the trailer is integrally formed in the engagement bar.

* * * * *